Feb. 2, 1932.  H. W. INGLE  1,843,159
GLASS BLOWING MACHINE AND METHOD
Filed Aug. 30, 1924   19 Sheets-Sheet 1

Fig. 1.

Witness:
S. S. Grotta

Inventor:
Henry W. Ingle
by Wm N Houiss
Atty.

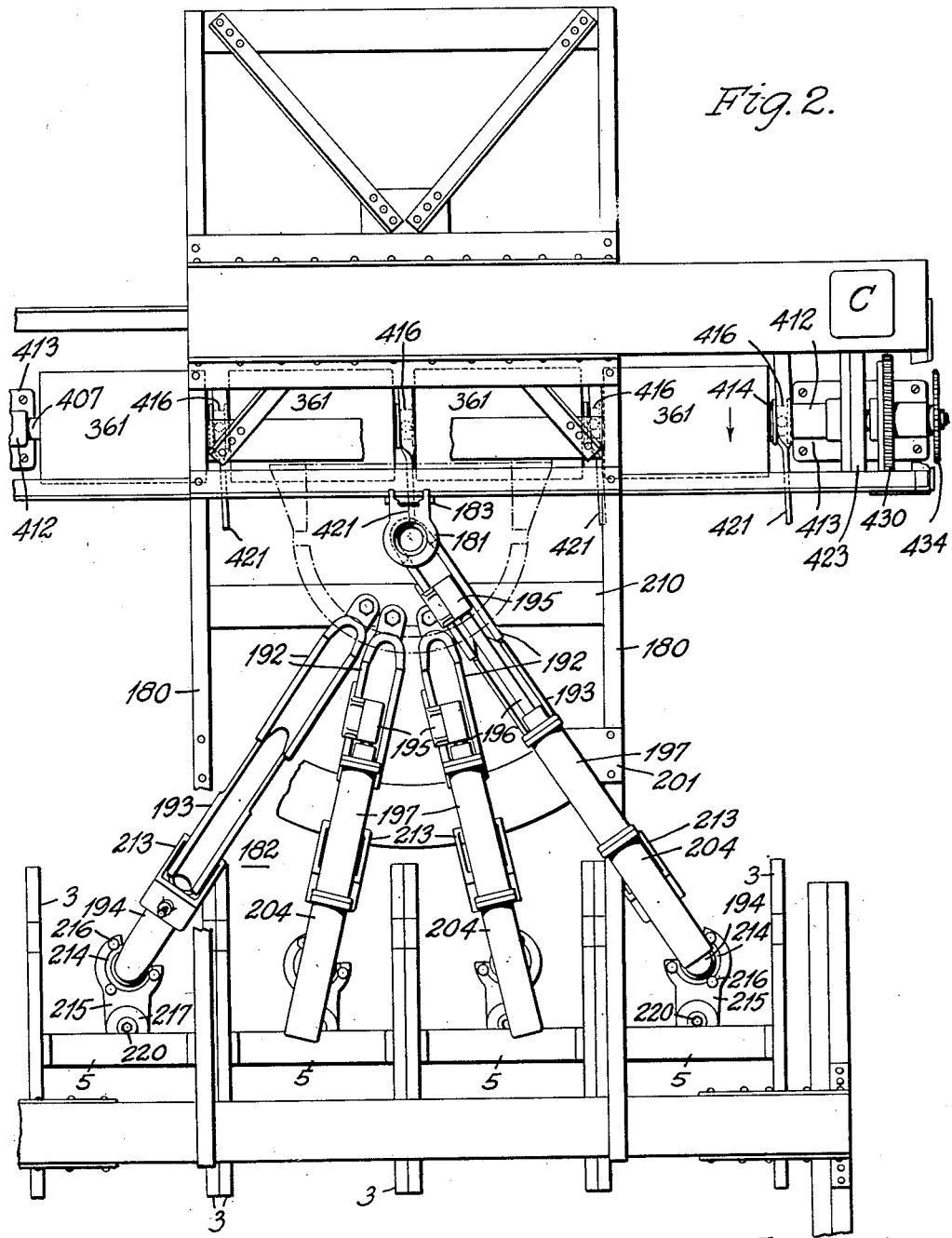

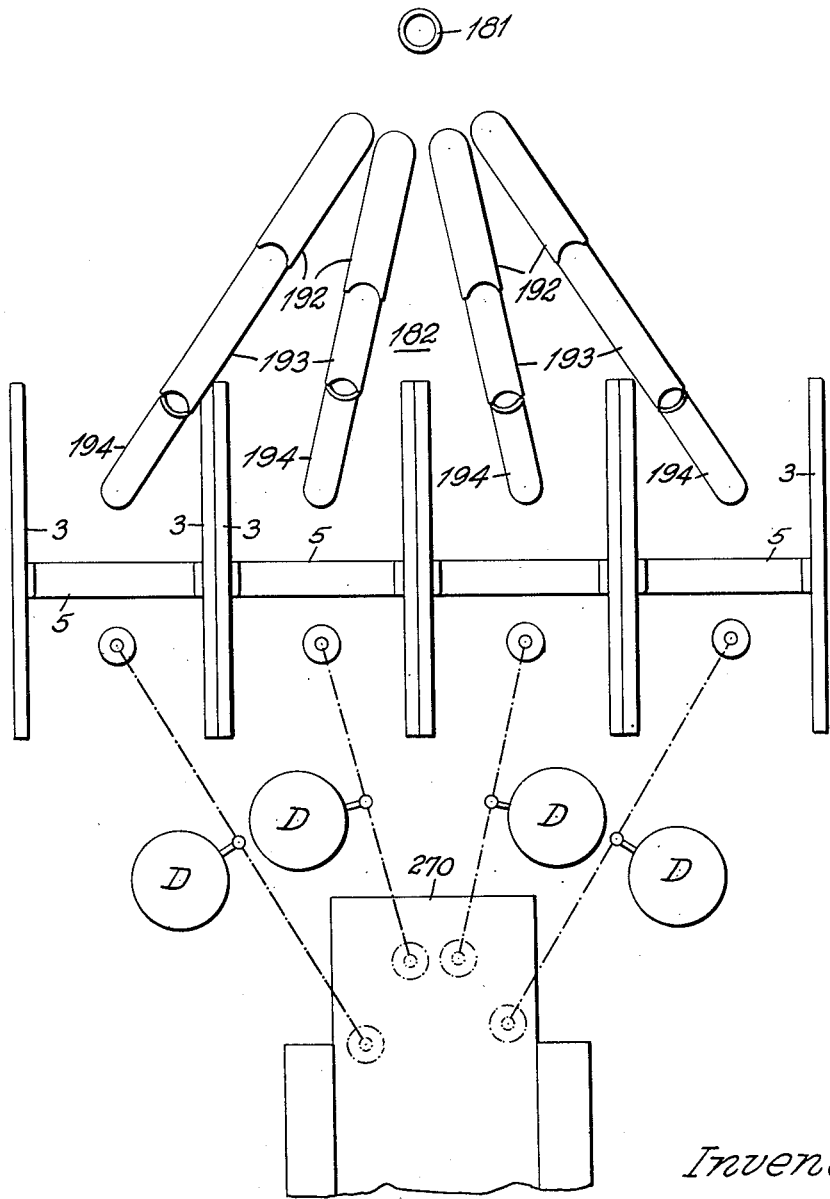

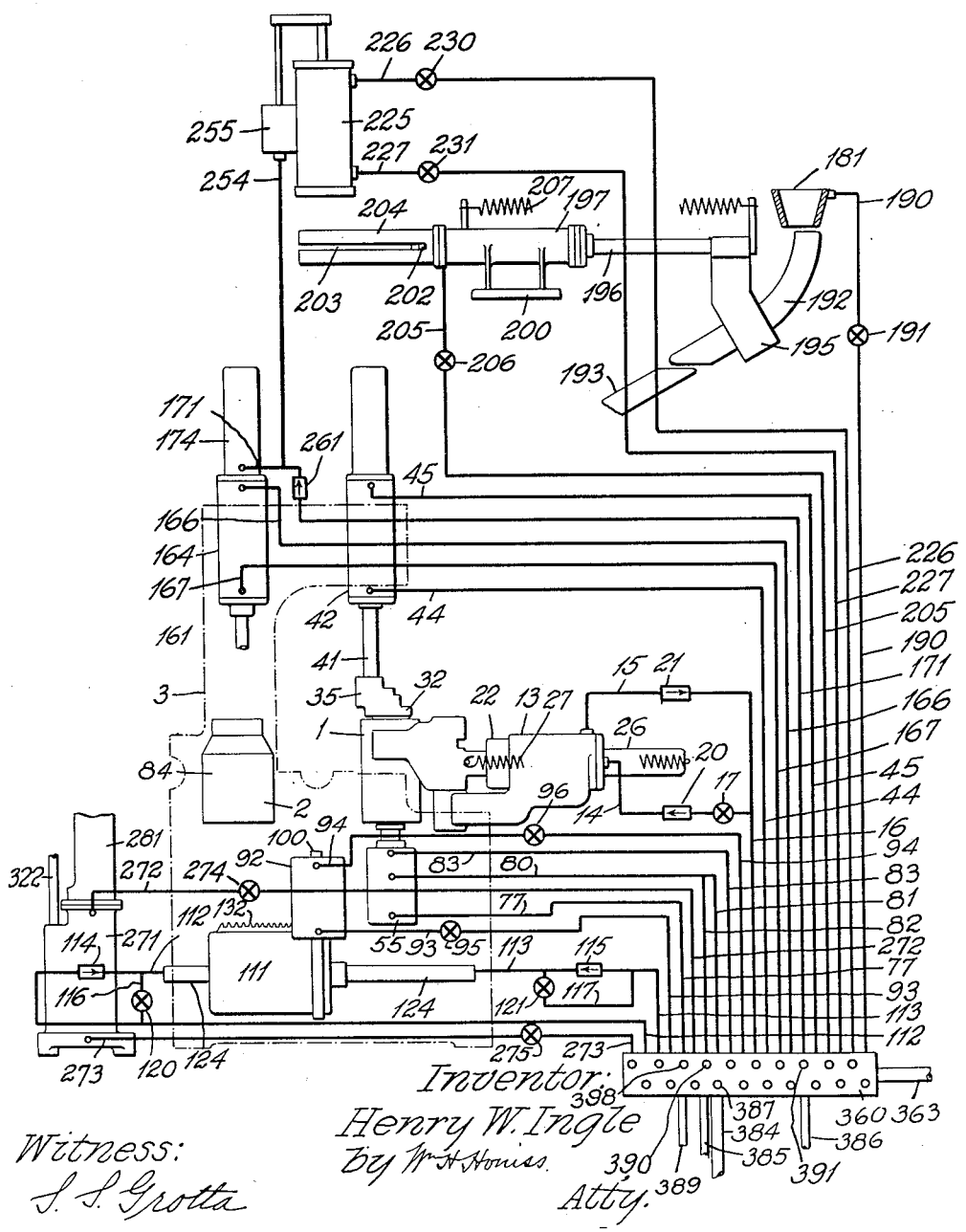

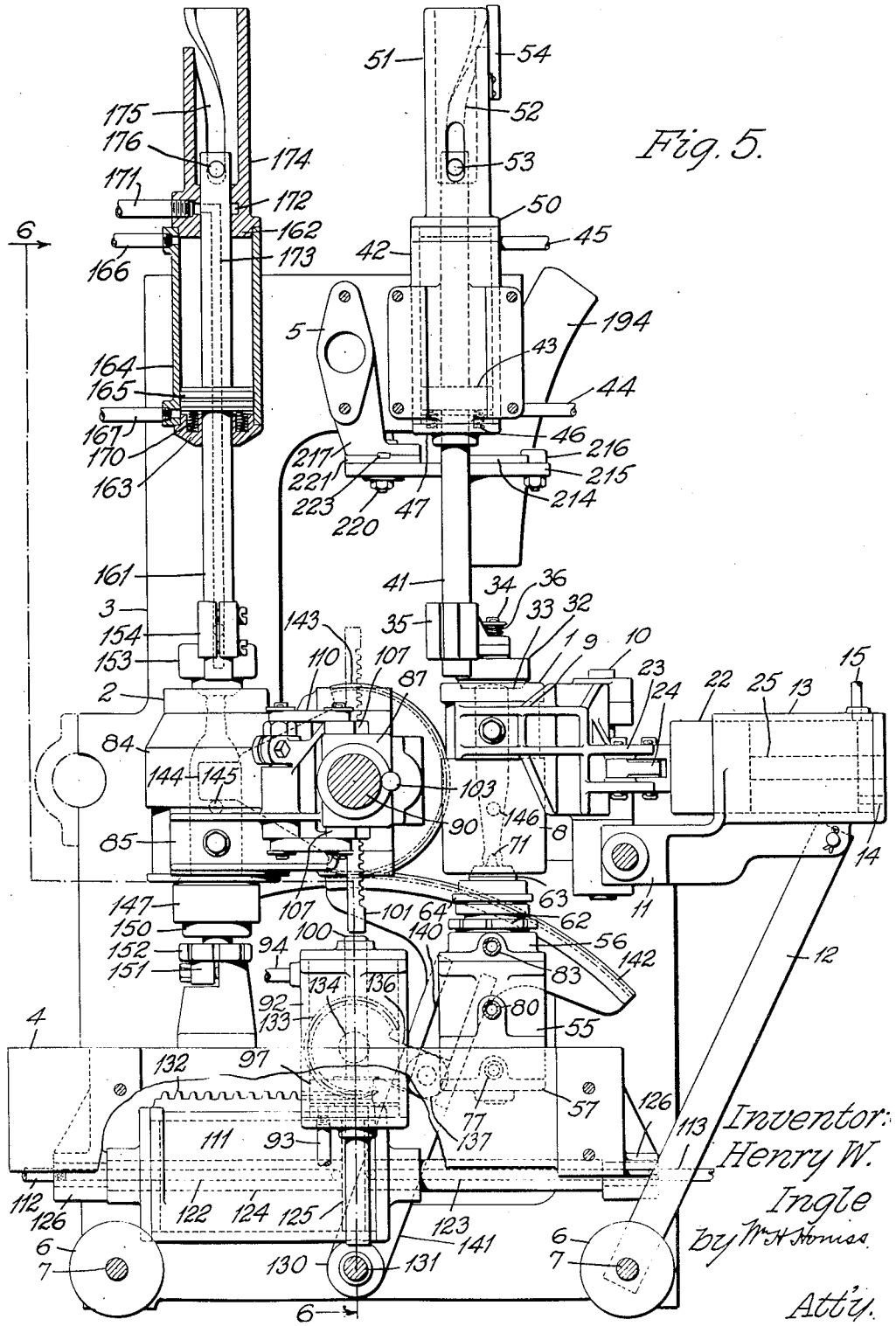

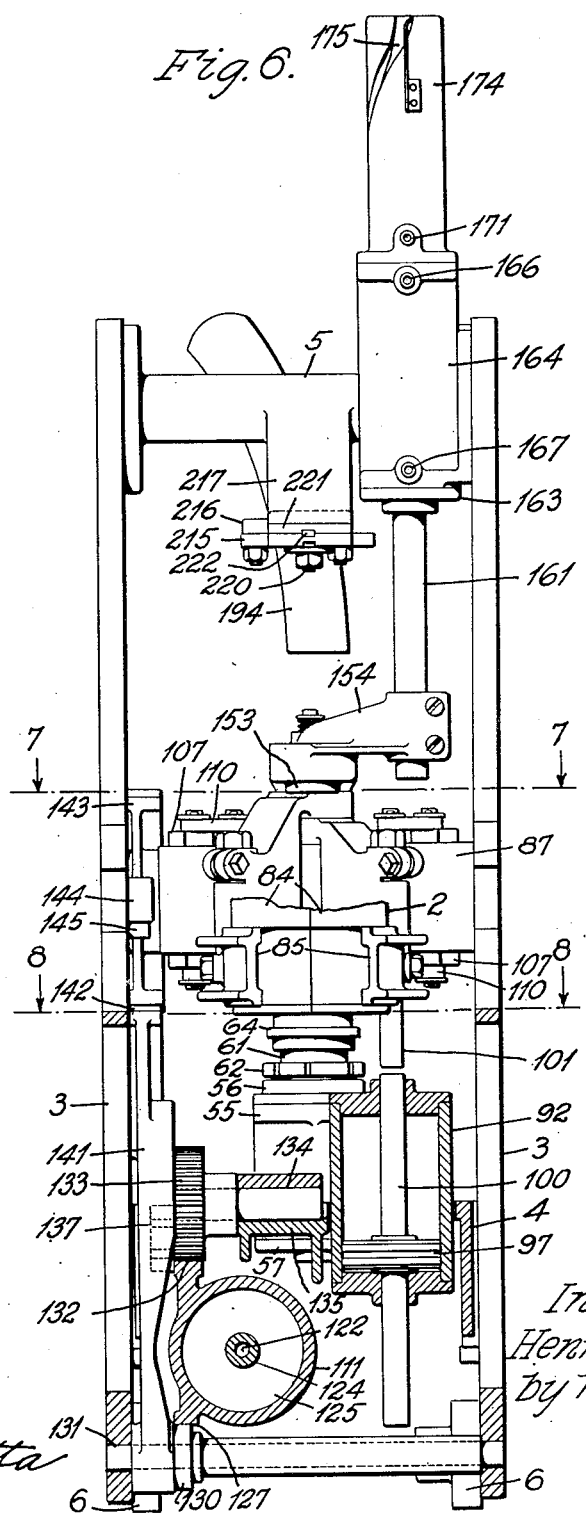

Feb. 2, 1932. H. W. INGLE 1,843,159
GLASS BLOWING MACHINE AND METHOD
Filed Aug. 30, 1924 19 Sheets-Sheet 7
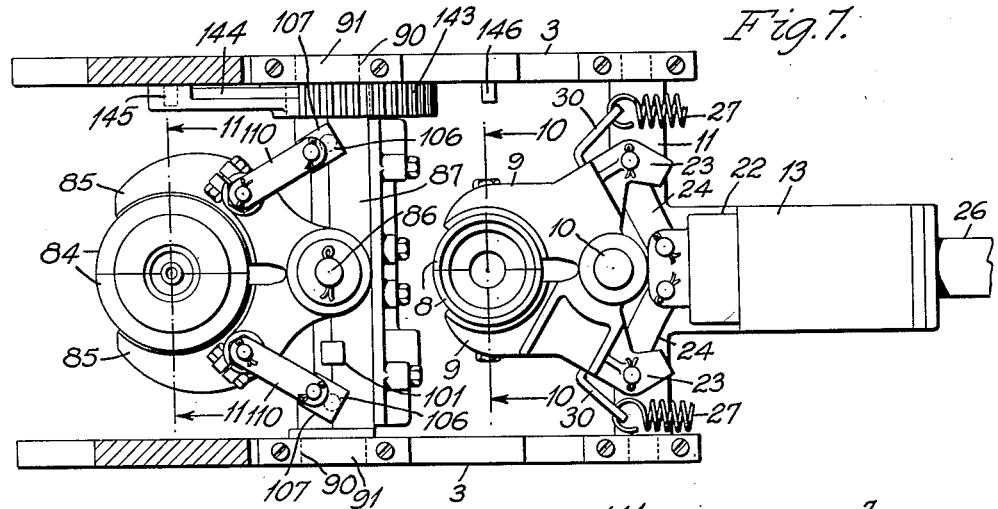
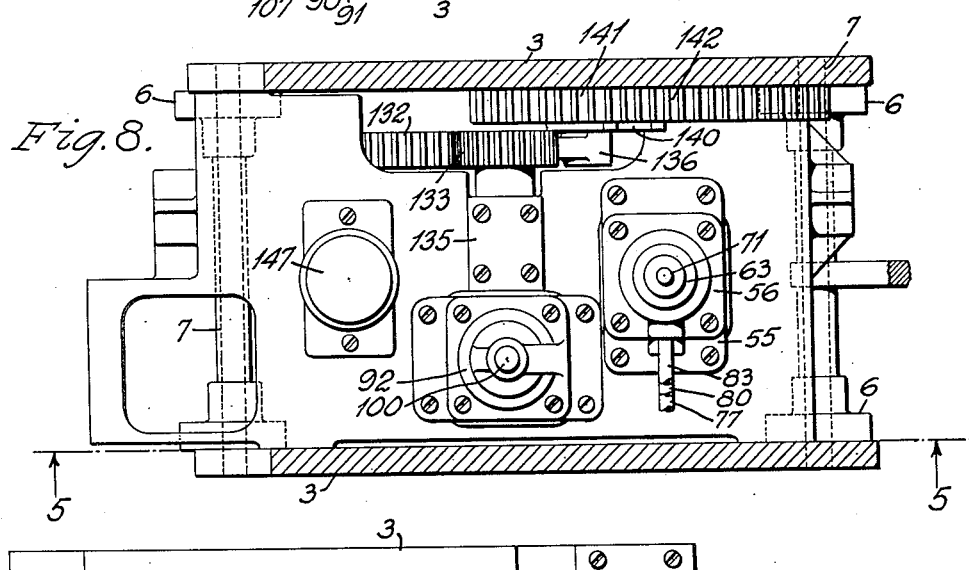
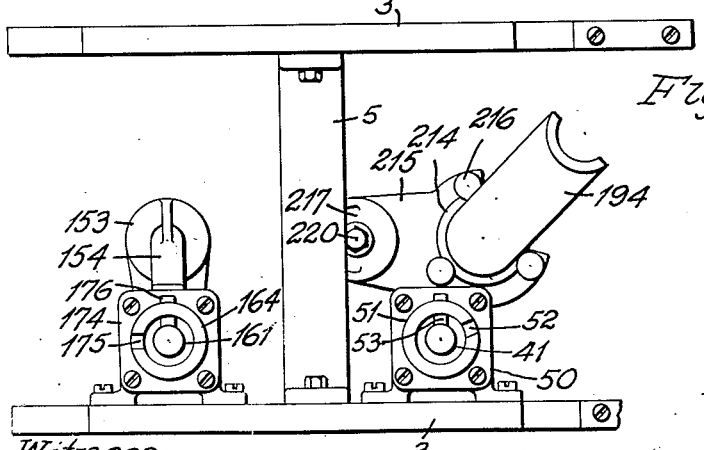
Inventor:
Henry W. Ingle

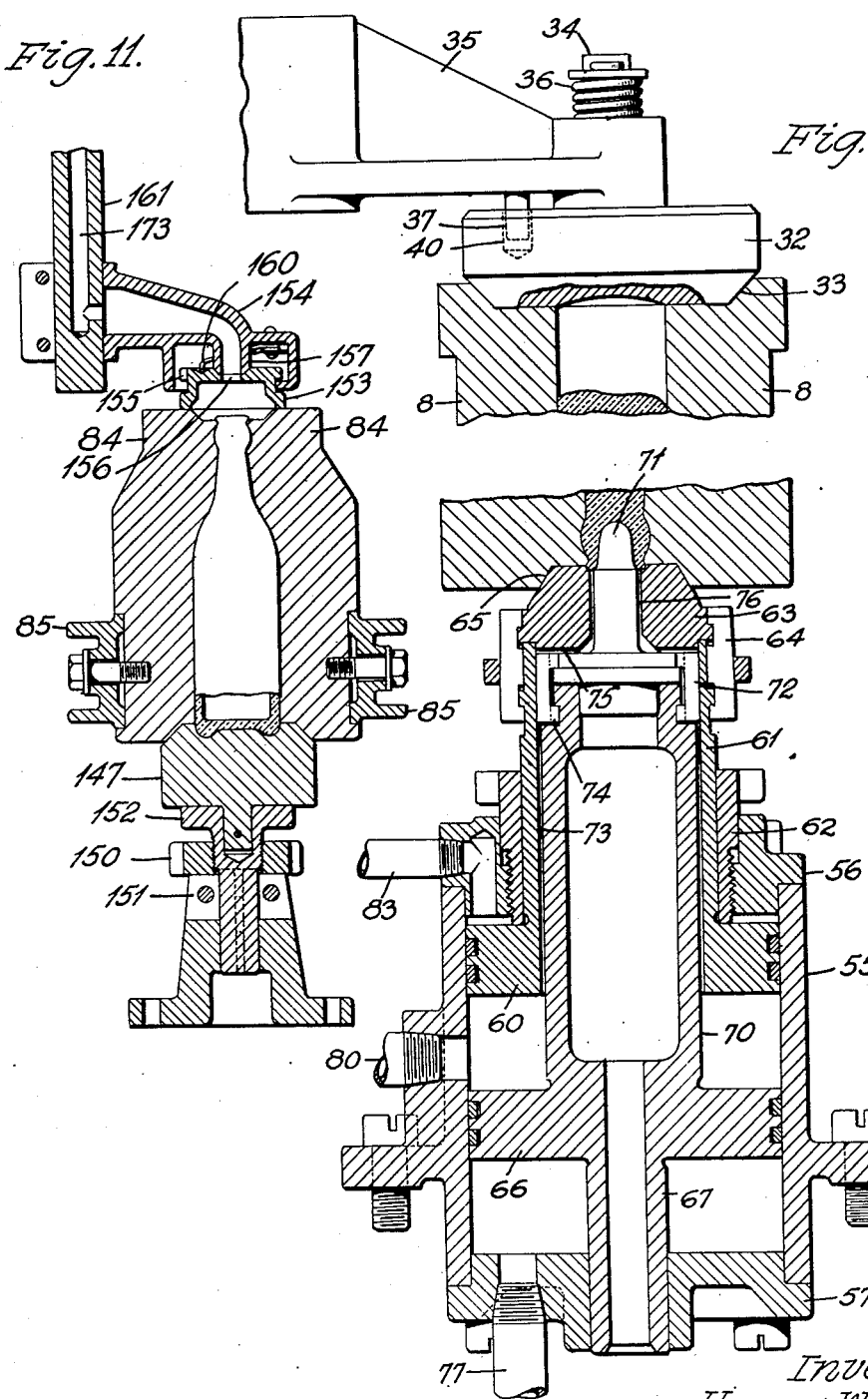

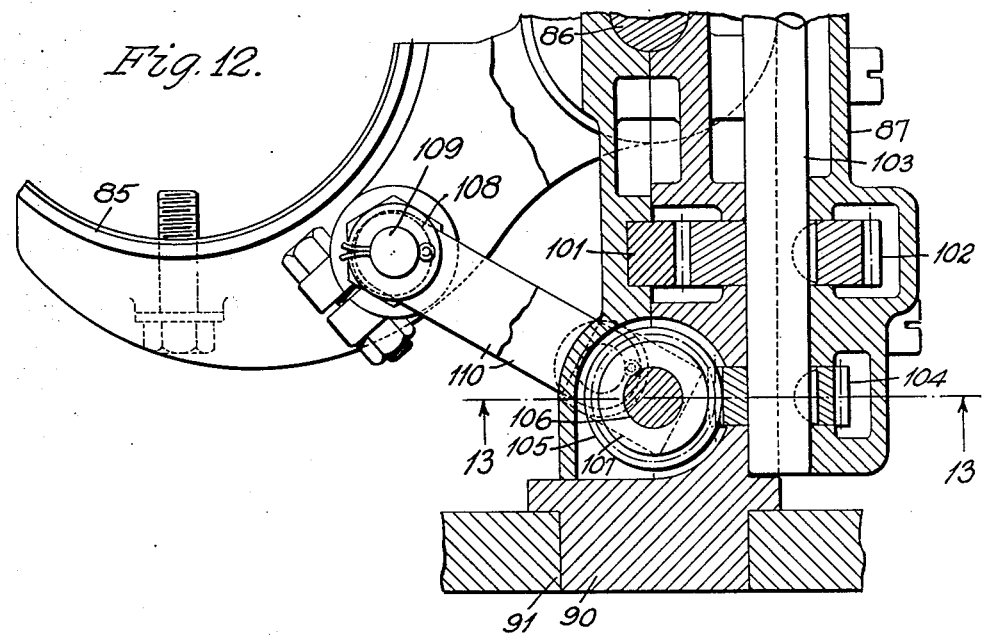
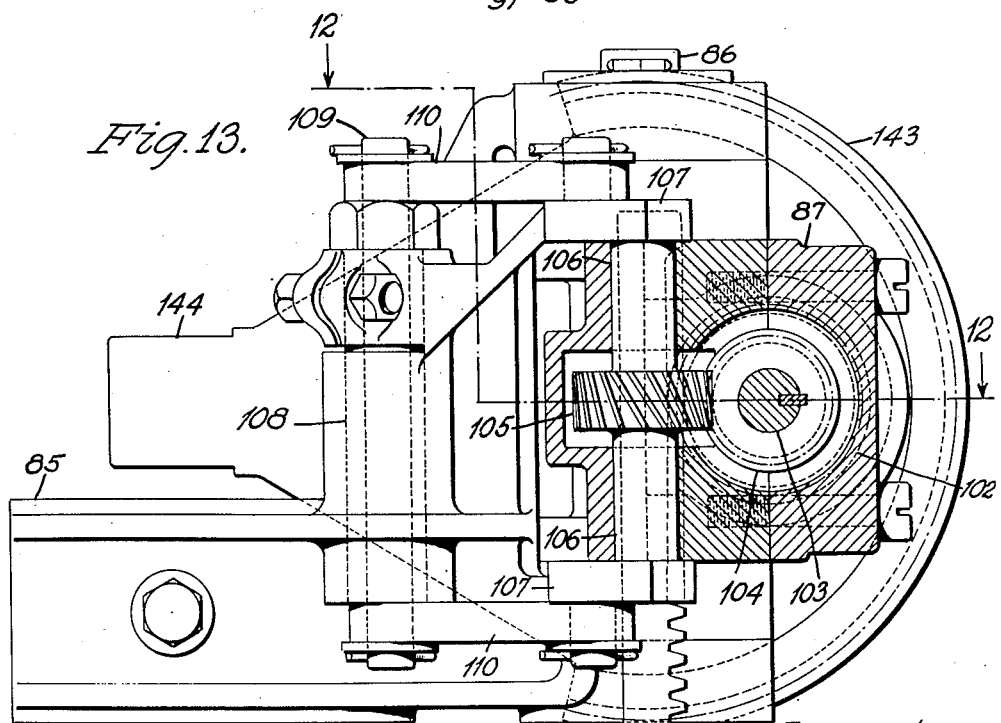

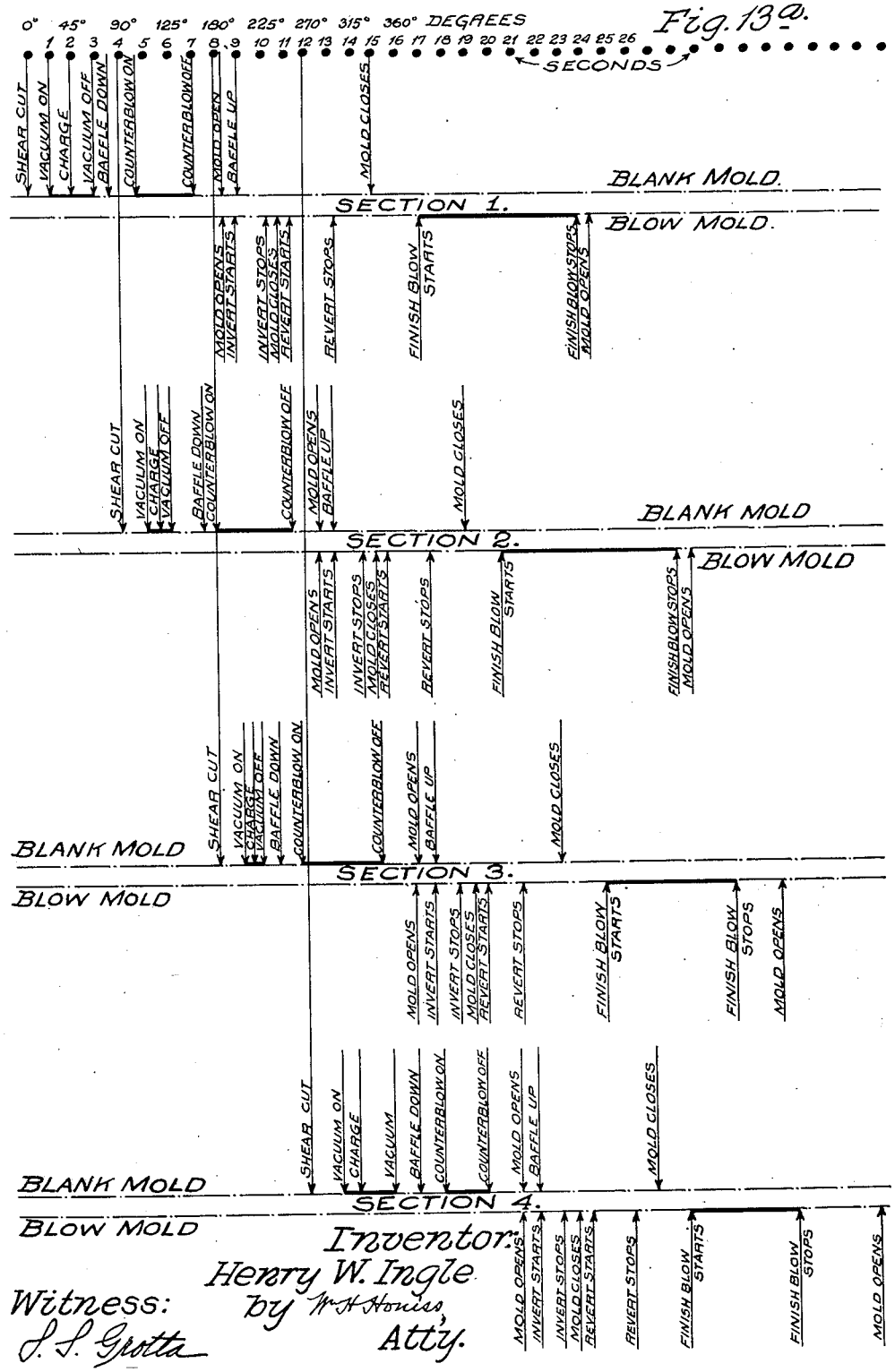
Fig. 13ᵃ.

Feb. 2, 1932.    H. W. INGLE    1,843,159
GLASS BLOWING MACHINE AND METHOD
Filed Aug. 30, 1924    19 Sheets-Sheet 11

Witness:
S. S. Grotta

Inventor:
Henry W. Ingle
by W. H. Honiss
Atty.

Feb. 2, 1932.　　　　H. W. INGLE　　　　1,843,159
GLASS BLOWING MACHINE AND METHOD
Filed Aug. 30, 1924　　　19 Sheets-Sheet 12
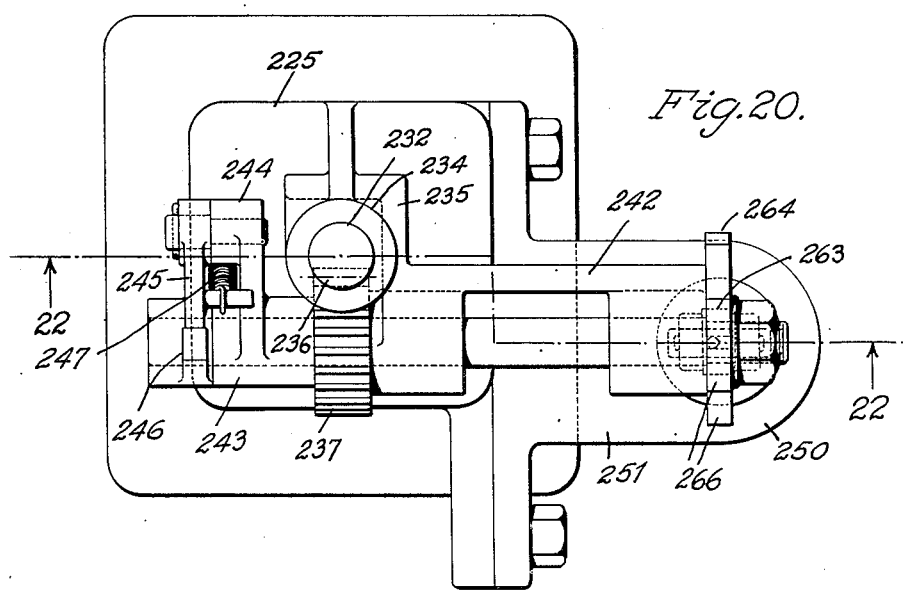
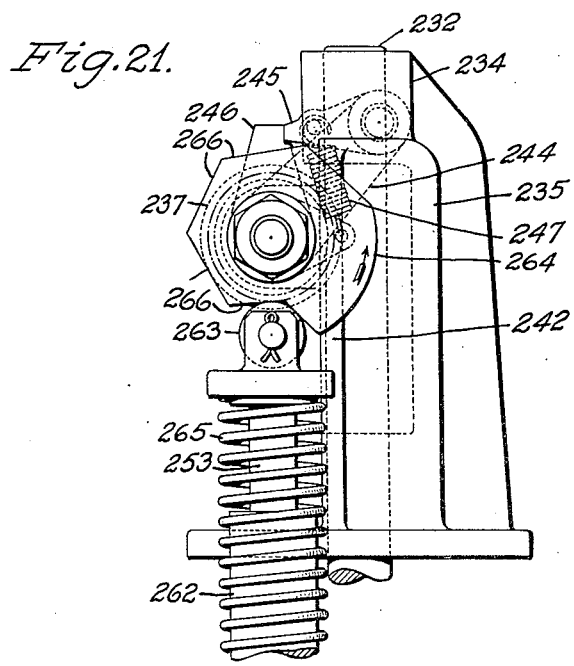
Inventor:
Henry W. Ingle

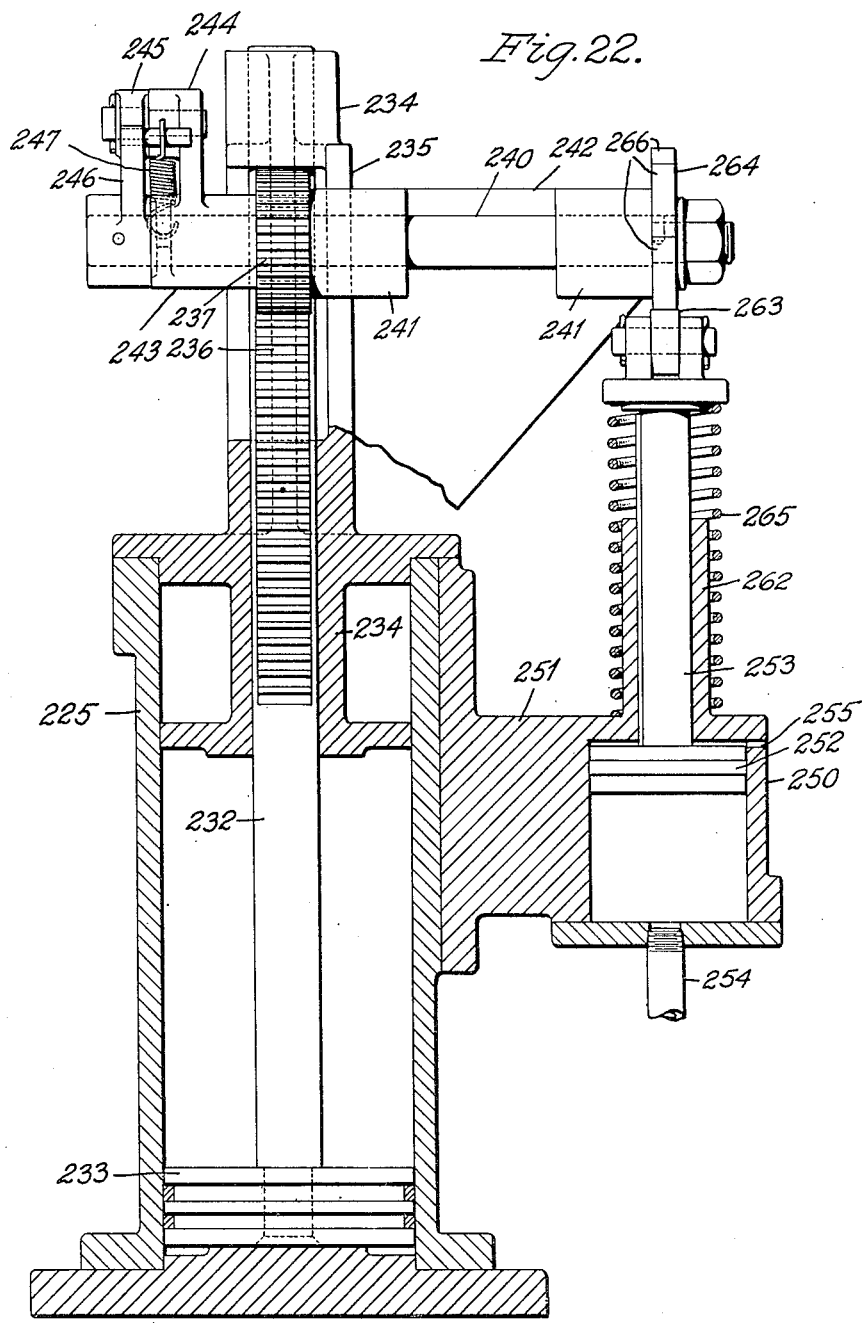

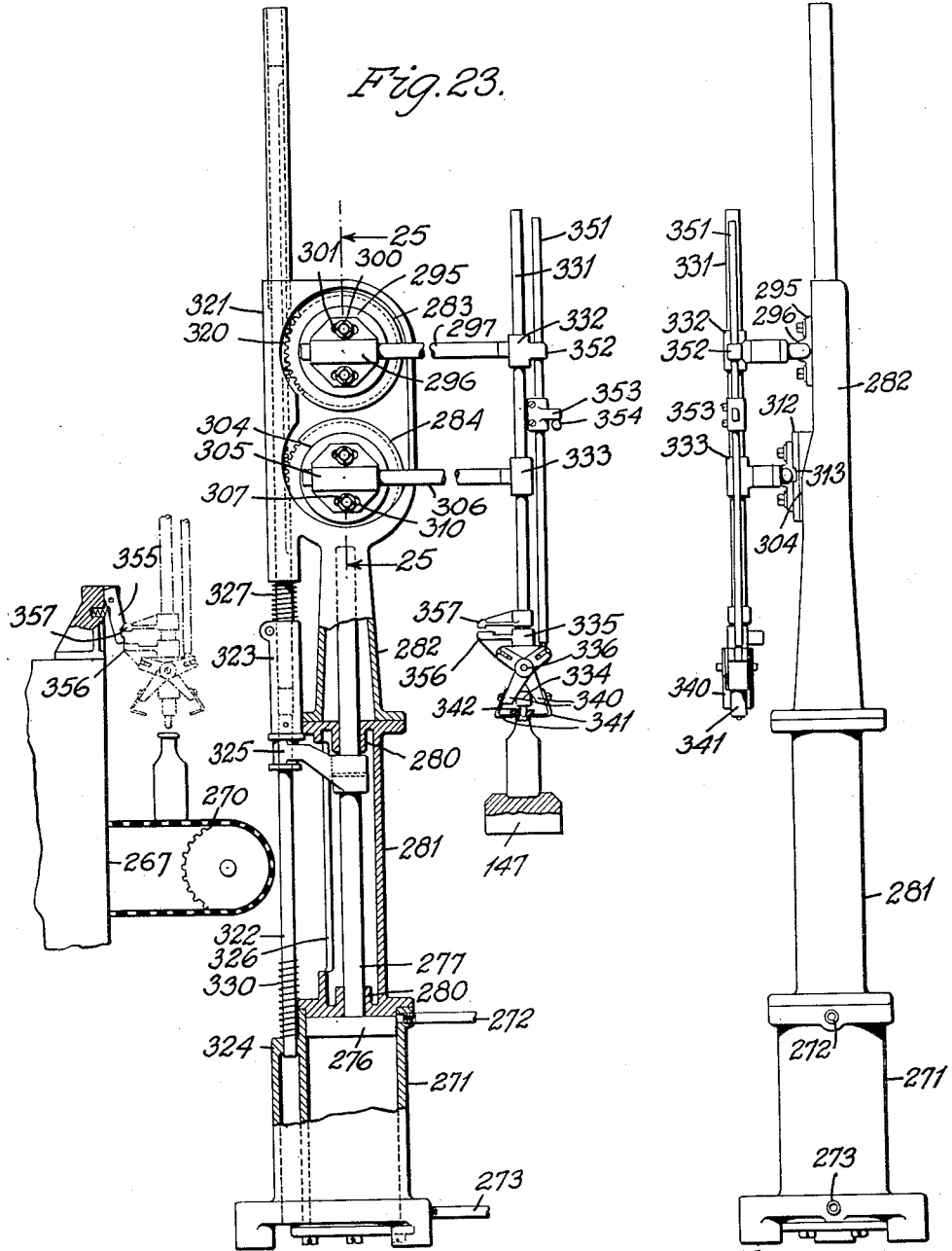

Feb. 2, 1932.  H. W. INGLE  1,843,159
GLASS BLOWING MACHINE AND METHOD
Filed Aug. 30, 1924  19 Sheets-Sheet 15
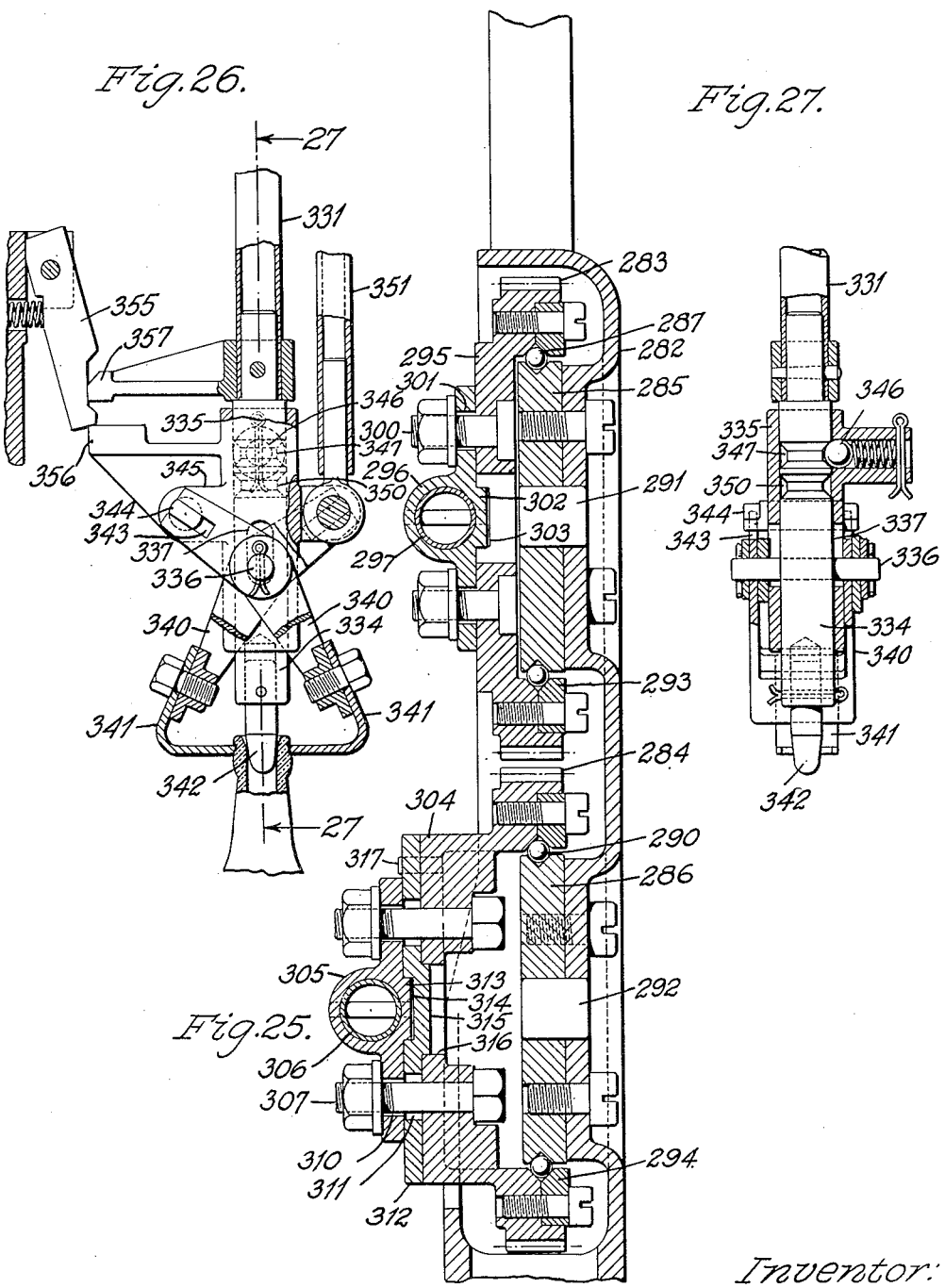
Witness:
S. S. Grotta
Inventor:
Henry W. Ingle
by W. H. Honiss
Atty.

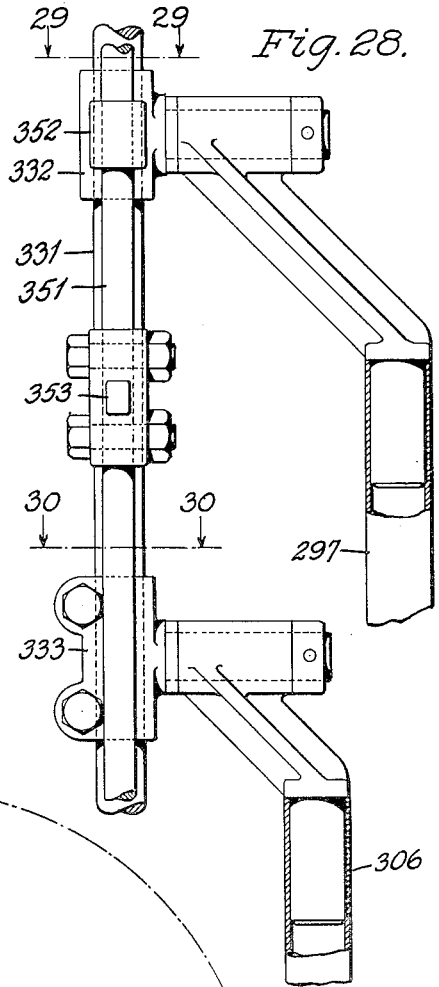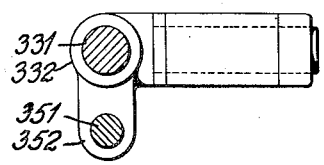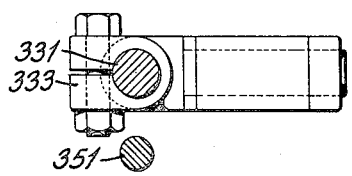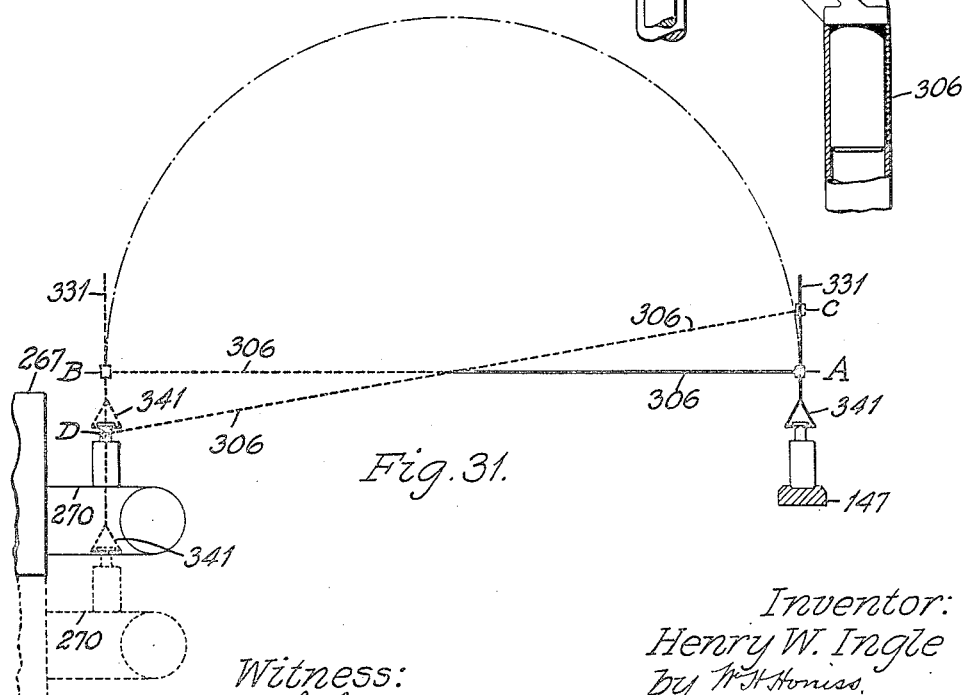

Feb. 2, 1932.  H. W. INGLE  1,843,159
GLASS BLOWING MACHINE AND METHOD
Filed Aug. 30, 1924    19 Sheets-Sheet 17

Witness:
S. S. Grotta

Inventor:
Henry W Ingle
by W. H. Honiss
Atty.

Feb. 2, 1932.  H. W. INGLE  1,843,159
GLASS BLOWING MACHINE AND METHOD
Filed Aug. 30, 1924   19 Sheets-Sheet 18

Witness:
S. S. Grotta

Inventor:
Henry W. Ingle
by W. H. Homiss
Att'y.

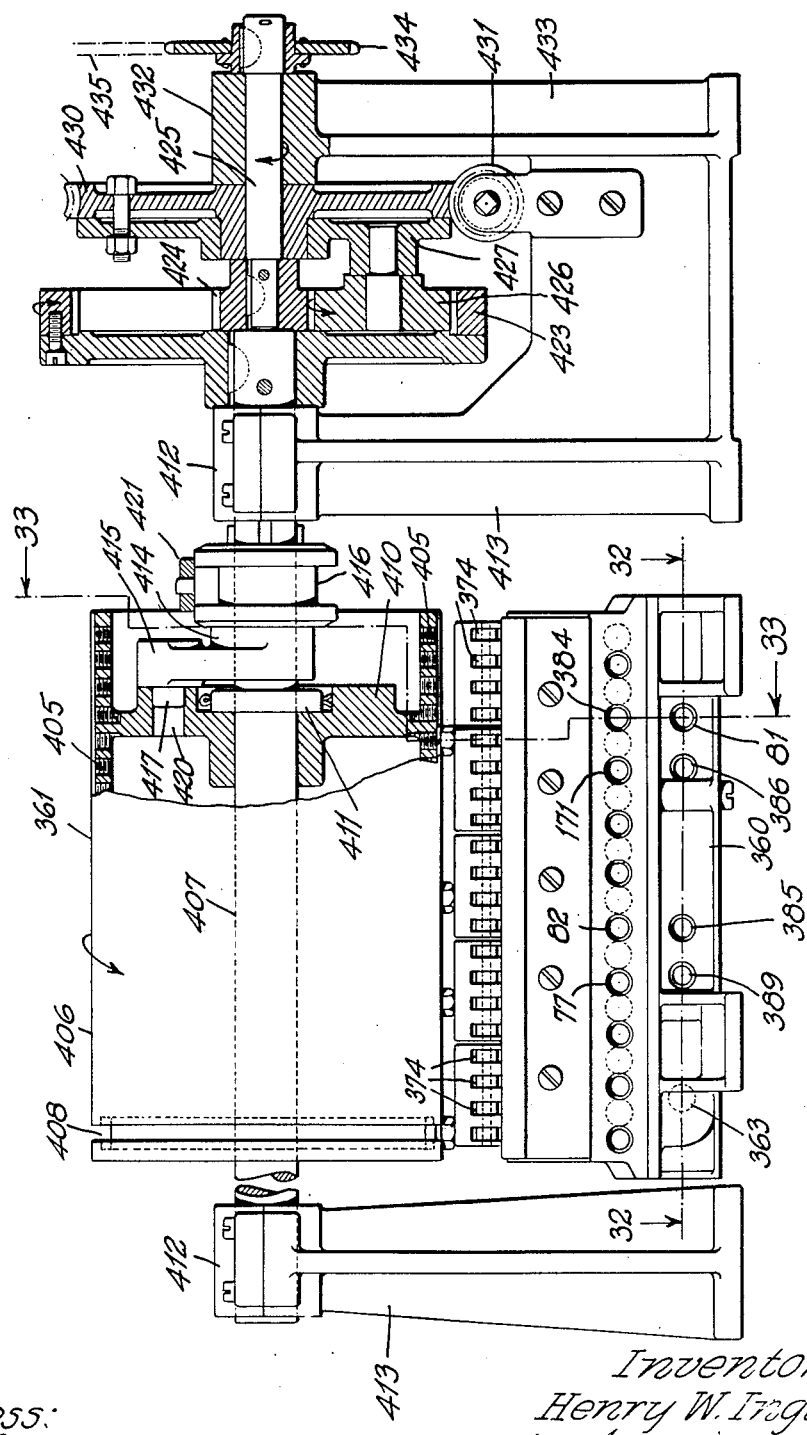

Patented Feb. 2, 1932

1,843,159

UNITED STATES PATENT OFFICE

HENRY W. INGLE, OF HARTFORD, CONNECTICUT, ASSIGNOR TO HARTFORD-EMPIRE COMPANY, OF HARTFORD, CONNECTICUT, A CORPORATION OF DELAWARE

GLASS BLOWING MACHINE AND METHOD

Application filed August 30, 1924. Serial No. 735,079.

This invention relates to the manufacture of glassware, and it has particular relation to the production of blown glassware by the system in which blanks or parisons are formed in blank molds, are transferred to finishing molds, and are there blown into final shape.

One of the primary objects of the invention is to provide a method and apparatus for blowing glassware, wherein a plurality of machine sections are fed with mold charges from a single feeding source and wherein each section includes a pair of molds, consisting of a blank mold and a blow mold or finishing mold. Each pair of molds is mounted and operated independently of the other pairs of molds, and the blank molds are fixed permanently at the charge-receiving stations.

Another object of the invention is to provide a machine comprising a plurality of independently operating sections of the above indicated character, in which the duration of the operations performed upon the glass in each of the molds of each pair may be varied within wide limits determined by the operation of the molds concurrently as one extreme and the operation thereof successively as the other extreme, independently of the other sections of the machine, and in which the various operations performed by each section may also be varied with respect to one another so as to cause each individual section to suit the needs of the particular kind of ware that is made by that section.

A further object of the invention is to provide a method and apparatus for blowing glassware in which improved temperature control is secured by utilizing relatively heavy molds. I accomplish this result by mounting some or all of the molds in stationary positions. Such stationary molds may be made much more massive than molds which are mounted upon rotary mold tables, as is the usual practice.

A still further object of the invention is to provide an apparatus for blowing glassware in which the molds and the parts cooperating therewith are mounted rigidly, solidly and with a minimum number of moving parts, thereby resulting in proper registration and cooperation between the engaging parts of the apparatus.

A still further object of the invention is to provide a system for blowing glassware in which the molds are capable of producing a larger quantity of ware than can be produced in ordinary machines of the rotary type, thereby reducing the number of molds required for a given output, or increasing the output for a given number of molds.

A still further object of the invention is to provide apparatus of the character described, embodying a plurality of individual glass shaping machines or sections, each having a delivery trough mechanism which is adapted to successively deliver mold charges thereto in timed sequence from a single glass feeding device.

A still further object of the invention is to provide an apparatus of the character described, embodying a blowing device for initially delivering to the blank or parison successive puffs of varying duration and volume, separated by intervals of suction or sub-atmospheric pressure, in order to impart to the parison a preliminary configuration which will tend to produce ware having a uniform wall thickness, when completely blown.

A still further object of the invention is to provide an apparatus of the character set forth, embodying a simple and efficient take-out device for removing the ware from the finishing molds and delivering it at a desired location, such as upon a conveyor mechanism or to a leer, and which may be easily adjusted to operate between different levels.

A still further object of the invention is to provide a machine of the character described, in which the blanks or parisons are transferred from a blank forming station to a finish blowing station by means oscillating between these stations and offset with respect to its axis of swinging movement, with the longitudinal axis of the blank disposed substantially tangentially to the arc described by the center of gravity of the blank, thereby to a great extent counteracting the tendency for centrifugal action to throw or distort the shape of the blank during the transferring operation and rendering possible an increased operating speed.

A still further object of the invention is to provide an apparatus of the above indicated character, in which the movements of the several parts of each section shall be effected independently of each other through the medium of a separate valve-controlled fluid pressure means, whereby the mechanism is simplified, as compared with the glass blowing machines heretofore used, and which shall embody valve-actuating devices for adjustably operating the several valves in proper sequence and in timed relation with the operation of the common feeding device.

Bottles and other blown glass articles are made in a great variety of sizes and shapes. For each style of glassware there is an ideal cycle of operations between the time when a mold charge is deposited in the parison mold, and the time when the finished ware is removed from the blow mold. Some kinds of ware are best made by allowing the glass to remain in the parison mold for a relatively short time and to remain in the blow mold for a relatively longer time. For other styles of ware, the glass should remain in the parison mold for a longer time in order to produce a thicker skin or enamel on its walls. The timing and duration of various other operations performed on the glass, such as settling in the parison mold to form the neck finish, counter-blowing in the parison mold, and the application of air pressure in the finishing mold are also subject to variation, and the best ware is produced when each one of these several operations is given its most effective place in the general cycle and is allowed to continue for the most effective period of time.

Rotary machines of the type now commonly employed for making bottles and other forms of blown glassware afford only a limited range of variation in the timing and duration of the several operations mentioned above, by reason of the fact that a number of pairs of molds, each consisting of a blank mold and a blow mold, are mounted on rotary tables, and the successive operations must be performed on the glass at definite stations. There is necessarily a fixed time interval between the arrival of the glass at one station and its arrival at the next station. If, for example, one of these stations is the transfer station, where the glass is transferred from the blank mold to the finishing mold, and the next station is the finish-blowing station, the interval between these stations is a fixed quantity for any given type and speed of machine. If this time interval is exactly correct for one style of ware, it is only approximately correct for any other style of ware. In a similar way, there are fixed time intervals between mold-charging and settle-blowing, settle-blowing and counterblowing, counterblowing and transfer, transfer and finish-blowing, and between finish-blowing and take-out. On account of the relatively fixed cycle of operations imposed by the nature of the rotary machine, such a machine operates at its maximum efficiency upon one style of ware only, and in making all other styles of ware it is necessarily more or less inefficient.

The present invention avoids the inflexibility of rotary machines, as to the allocation of the cycle of operations between the several steps of the process, by providing for the correct apportioning of time to the various steps of the fabricating process. In addition, this machine is given still greater flexibility and greater capacity for individual adjustment of the cycles of its molds, by separating each pair of molds from every other pair, and by giving to each pair of molds an independent cycle of operations in which each step may be so adjusted that it is allotted the necessary position and fraction of the cycle which is called for by the particular kind of ware that is being made by that pair of molds.

A complete installation consists of a plurality of these sections, and a common feeding apparatus is employed for delivering mold charges to the several sections in proper succession. On account of the division of the machine into individual and independently operating sections, this machine is termed an "individual section" machine.

The independent adjustability of the sections of this machine makes it well adapted for the production of a variety of small quantities of ware of different shapes and sizes. Glass factories have much difficulty in filling small orders for ware of different kinds, and it is usually the practice in such instances to either produce the ware by hand or to equip a large automatic machine with a plurality of differently shaped molds capable of producing ware to the desired varying shapes. In the latter case, certain disadvantages are encountered, one of the most serious of which is that if it should become necessary to stop the machine in order to either adjust or repair any one of the different molds, or to change the molds as orders of a certain shape are completed, the entire production is temporarily interrupted. Also, the machine is capable of producing perfectly only one of the several styles of ware which it may be called upon to produce simultaneously, and the other styles are often so imperfect that they must be discarded.

Further objects of the invention include such novel features of construction and arrangement as are disclosed in the accompanying specification and drawings, in which Figure 1 is a side elevational view of a glass working apparatus constructed in accordance with the invention, certain parts being omitted and certain other parts being shown in section;

Fig. 2 is a plan view of the structure shown in Fig. 1, illustrating in particular the mechanism for successively delivering mold charges from a single feeding outlet to the several shaping machines;

Fig. 3 is a diagrammatic plan view of the apparatus showing the relative positions of the delivery mechanism, shaping machines and ware transferring mechanisms;

Fig. 4 is a piping diagram of one section of the apparatus;

Fig. 5 is a side elevational view of one of the shaping machines, certain parts being shown in section on the line 5—5 of Fig. 8;

Fig. 6 is a view partly in front elevation and partly in section on line 6—6 of Fig. 5;

Fig. 7 is a plan view of one of the shaping machines, with parts in section on line 7—7 of Fig. 6, illustrating the relative position of the blank and blow molds;

Fig. 8 is a plan view of one of the shaping machines, with parts in section on line 8—8 of Fig. 6, illustrating the relative positions of the bottom plates and the inverting mechanism of the blow mold;

Fig. 9 is a plan view of one of the shaping machines, illustrating the relative positions of the mechanisms which actuate the cover plate of the blank mold and the blowhead of the blow mold, and also the adjustable mounting of the mold charge deflector, the molds and the actuating mechanism thereof being omitted;

Fig. 10 is an enlarged sectional elevational view through the blank mold and the mechanism which actuates the neck plunger and plunger ring, the section being taken on line 10—10 of Fig. 7;

Fig. 11 is a similar view on a smaller scale taken on line 11—11 of Fig. 7, illustrating the blow mold and the bottom plate and blowhead thereof;

Fig. 12 is an enlarged fragmentary sectional view taken on line 12—12 of Fig. 13, illustrating the mechanism which opens and closes the respective sections of the blow mold;

Fig. 13 is a view, partly in side elevation and partly in section, on line 13—13 of Fig. 12;

Fig. 13a is a chart illustrating the range of adjustments of the operations of one of the sections relative to one another, and relative to the corresponding operations of the other sections.

Figure 19:
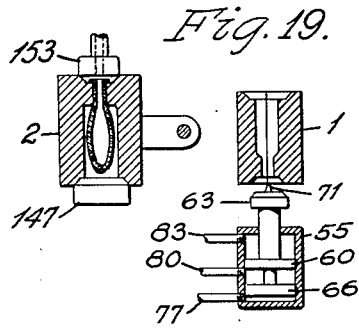
Figure 19A:
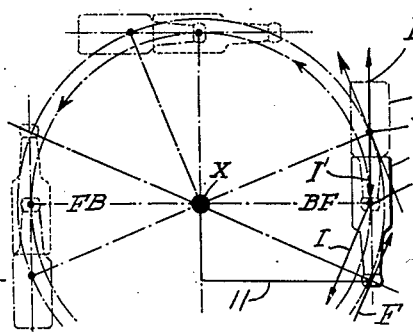

Figs. 14 to 19 inclusive are diagrammatic views illustrating the various positions occupied by the blank and blow molds and the sequence of operation thereof;

Fig. 19a is a composite diagrammatic view illustrating the present method of transferring a blank from a blank forming station to a finish blowing station in comparison with the old method of transferring a blank between these stations;

Fig. 20 is a plan view of the mechanism for delivering the initial intermittent blowing pressure to the blank in the blow mold;

Fig. 21 is a side elevational view of the upper portion of the structure shown in Fig. 20;

Fig. 22 is a sectional elevational view taken on line 22—22 of Fig. 20;

Fig. 23 is a side elevational view of the ware transferring mechanism and its relative position with respect to the blow mold, bottom plate and leer conveyor, certain portions thereof being illustrated in section;

Fig. 24 is a side elevational view of the structure shown in Fig. 23.

Fig. 25 is an enlarged sectional elevation taken on line 25—25 of Fig. 23;

Fig. 26 is an enlarged elevational view of the tongs mechanism, certain parts being shown in section;

Fig. 27 is a sectional elevational view taken on line 27—27 of Fig. 26;

Fig. 28 is an enlarged elevational view illustrating in detail the construction of the arms of the ware transferring mechanism;

Fig. 29 is a sectional plan view taken on line 29—29 of Fig. 28;

Fig. 30 is a sectional plan view taken on line 30—30 of Fig. 28;

Fig. 31 is a diagrammatic view illustrating the movement of one of the ware transferring arms between the shaping machine and the leer conveyor, and illustrating the manner in which the same may be adjusted to operate between different levels.

Figure 34:
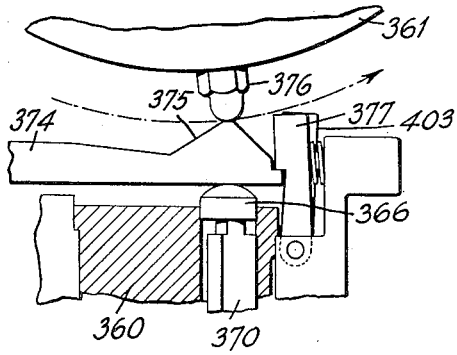
Figure 35:
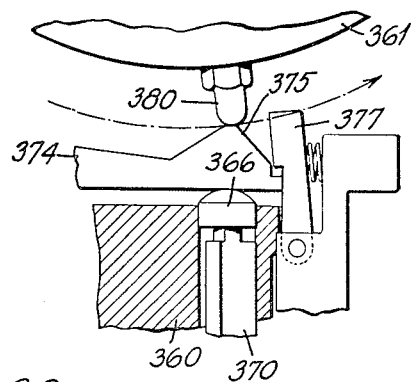
Figure 36:
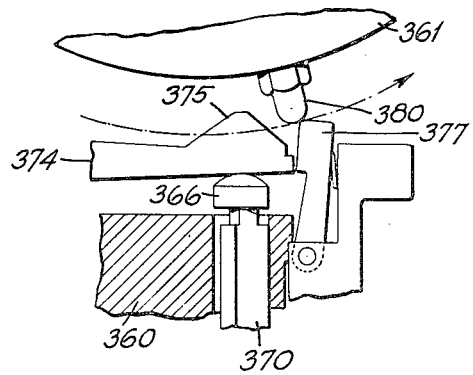
Figure 32:
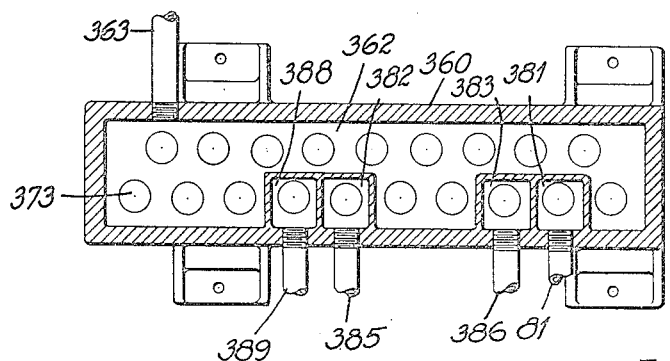
Figure 33:
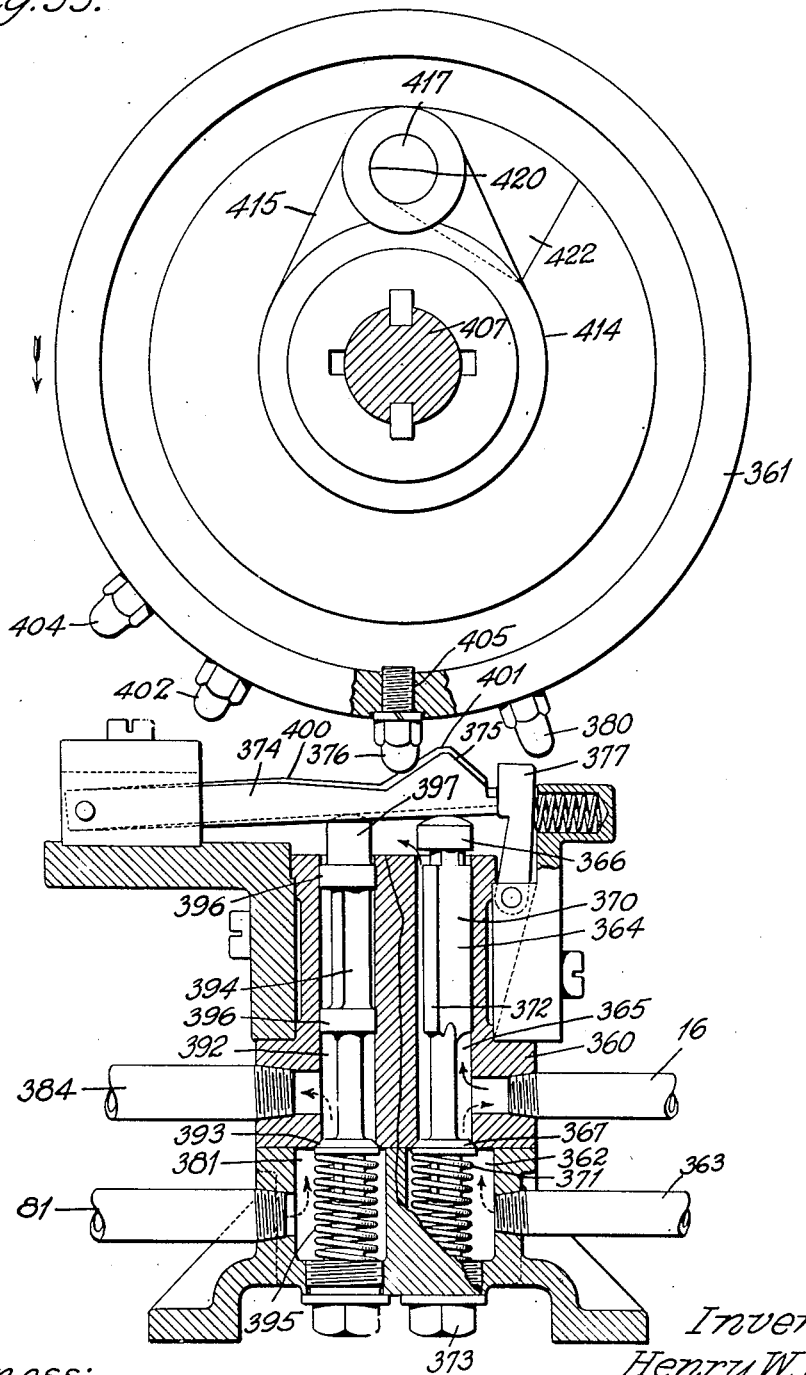

Fig. 32 is a sectional plan view through the valve chest taken on line 32—32 of Fig. 37, illustrating the several fluid pressure chambers provided therein;

Fig. 33 is an enlarged sectional elevational view on line 33—33 of Fig. 37 through the valve which controls the settling suction and the valve which controls the supply of fluid pressure to the operating cylinder of the blank mold;

Figs. 34, 35 and 36 are fragmentary detail views illustrating the several stages in the operation of an operating pressure control valve; and Fig. 37 is a view partially in elevation and partially in central vertical section, illustrating one of the valve actuating drums and its adjustable driving connection with the feeding device.

A glass working apparatus embodying the present invention is illustrated in general as comprising a plurality, four in this instance, of shaping machines or individual sections A, each embodying a single stationary blank mold and a single movable blow mold, each of said machines being capable of independently performing a complete molding operation; a delivery mechanism B for successively supplying the several shaping machines with mold charges of predetermined size and shape from a single glass feeding device; an initial or puff blowing device C for imparting a preliminary configuration to the blank in the blow mold subsequent to its transfer thereto from the blank mold and prior to the final blowing operation; a plurality of take-out devices D for removing the ware from each of the shaping machines, and conveying it to a desired location; and a pressure control mechanism E for adjustably regulating the application of the operating fluid pressures of the several shaping machines and those of the delivery and take-out instrumentalities, and also the application of the different blowing pressures and the settling suction, in proper sequence and in timed relation with respect to each other and to the operation of the feeding device. These several mechanisms will be described in the order mentioned above.

*Shaping machine (A)*

Figure 14:
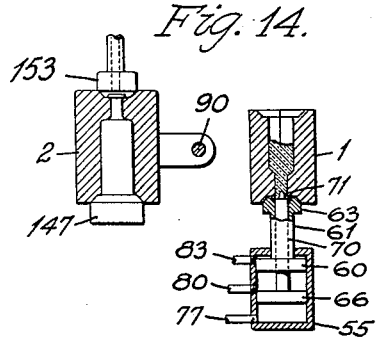
Figure 15:
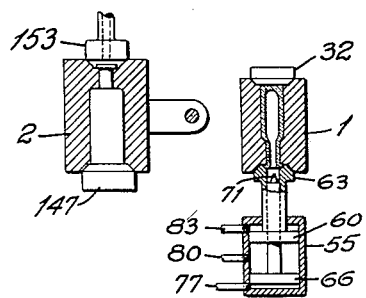
Figure 16:
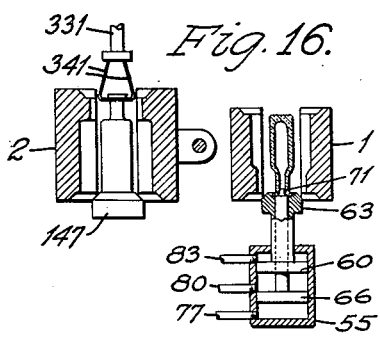
Figure 17:
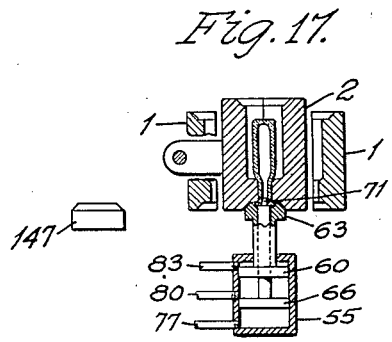
Figure 18:
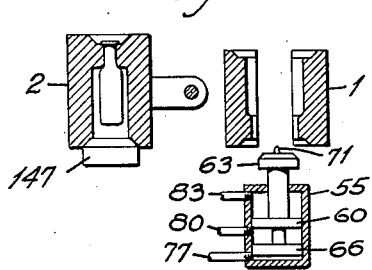

The shaping machines A are arranged in multiple, and in the present instance are secured together in side-by-side relation in any convenient manner, although it may be desirable to mount these machines upon a rotatable table or turret. With particular reference to Figs. 14 to 19 each of the machines or sections embodies a blank mold 1 which is disposed in a permanently inverted position at the blank-forming station, and a blow mold 2 which is adapted to swing about a horizontal axis from a neck-up position at a finish-blowing station (Fig. 16) to a neck-down position at a blank-forming station (Fig. 17) to close about a parison at the blank-forming station subsequent to the opening of the blank mold 1, and then to swing back to the finish-blowing station, thereby positioning the parison at the finish-blowing station in a neck-up position (Fig. 18). According to the present invention, the blow mold effects the actual transfer of a parison from the blank-forming station to the finish-blowing station, in contrast to machines in which such transfer is effected through the medium of neck rings or other transfer devices.

The molds 1 and 2 are carried by a structure consisting of side frames 3, which are secured together adjacent to their lower portions by a base member 4, and at their upper ends by a tubular brace 5. This structure is mounted upon wheels or rollers 6 on axles 7 carried by the side frames 3 (Figs. 1 and 5).

The blank or parison mold 1 comprises two sections 8, which are detachably secured to mold holders 9 (Figs. 5 and 7). The holders 9 are hinged upon a pin 10 which is carried by a bracket 11, supported by the side frames 3 and by a brace 12.

The mold sections 8 are closed by means of fluid pressure, which is admitted to a cylinder 13, and exhausted therefrom through pipes 14 and 15 respectively, which communicate with a pipe 16 (Fig. 4). The pipe 14 is provided with a regulating valve 17 by means of which the pressure delivered to the cylinder may be controlled as desired. The pipes 14 and 15 are provided with check valves 20 and 21 respectively. By means of this arrangement of valves a gradual pressure may be exerted through the pipe 14 in order to close the blank mold, and a rapid exhaust obtained through the pipe 15 to permit the mold to be opened quickly. The cylinder 13 is also carried by the bracket 11, and is provided with a piston 22 which is connected to arms 23 formed on the mold holders 9 by links 24. The piston 22 is provided with a rearwardly extending rod 25, which is slidably supported in a tubular housing 26 fixed to the rear wall of the cylinder 13.

The blank mold is opened, when the pressure in the cylinder 13 is exhausted, by springs 27, which are connected at their forward ends to arms 30, provided on the mold holders 9, and are attached at their rearward ends to a cross bar 31 carried by the tubular housing 26 (Fig. 1).

The upper portion of the blank mold, as viewed in the several drawings, is closed by a cover or baffle plate 32, which is shaped to seat within complementary depressions 33 formed on the mold sections 8 (Fig. 10). This cover plate is provided with a pin 34, which extends loosely through an opening in an arm 35, and is yieldably maintained in position therein by a spring 36. This construction permits the cover plate 32 to move laterally a limited amount to insure accurate contact when the cover plate is moved to close the blank mold. A pin 37 is provided on the arm 35 for loose engagement with a recess 40 formed on the cover plate 32, and prevents the latter from rotating on the pin 37 and becoming angularly displaced with respect to the blank mold in instances where the latter is shaped to form blanks, the bottoms of which are other than circular.

The arm 35, which supports the cover plate 32, is adjustably secured to the lower end of a vertically reciprocable piston rod 41, which extends upwardly through a fluid pressure cylinder 42 and is provided with a piston 43 (Fig. 5). The cylinder 42 is suitably secured to one of the side frames 3, and is supplied with fluid under pressure through pipes 44 and 45, in order to raise and lower the cover plate 32 with respect to the blank mold. Frictional contact between the cover plate 32 and the sections of the mold is avoided, when the latter are opened and closed, by means of a plurality of springs 46, which are suitably seated in the lower head 47 of the cylinder 42 and which resiliently support the piston 43 when the pressure above the same is relieved during such periods. These springs elevate the piston 43 a sufficient distance to provide clearance between the mold sections and the cover plate.

The upper portion of the piston rod 41 extends through and is slidably mounted in an upper cylinder head 50, which is formed with an upwardly extending tubular casing 51. The casing 51 functions as a protective housing for the upper portion of the piston rod 41, and is provided with a spiral slot 52 into which projects a pin 53, carried by the piston rod 41. As the piston 43 ascends, under the influence of fluid pressure admitted to the lower end of the cylinder 42, in order to elevate the cover plates 32, the slot 52, acting on the pin 53, imparts a partial rotation to the rod 41 that is sufficient to swing the cover plate 32 in a lateral direction and out of the path of the movable blow mold, the construction and operation of which will be hereinafter described. Upon the downward stroke of the piston 43, the cover plate is returned to a closing position over the blank mold. A latch spring 54, of suitable construction, is provided on the side of the casing 51 and is adapted to engage the pin 53 and prevent the piston, and parts carried thereby, from falling, in the event that the pressure is cut off or fails, when the piston occupies a raised position.

The lower portion of the blank mold 1 is closed and settling suction and counter-blowing pressures are applied to the mold charge by the following mechanism: A vertical fluid pressure cylinder 55, having upper and lower cylinder heads 56 and 57 respectively, is mounted on the base 4 and is disposed beneath the blank mold in axial alignment therewith (Fig. 10) A piston 60 operates in the upper portion of the cylinder 55 and is provided with a tubular extension 61 which extends through and is slidably mounted in a vertically adjustable sleeve 62 which is threaded into the upper cylinder head 56. A plunger ring 63 is removably secured to the upper end of the extension 61 by means of a split collar and ring device 64 and is adapted to engage complementary recesses 65 formed on the underside of the sections of the blank mold.

A piston 66 is mounted for operation in the lower portion of the cylinder 55 and is provided with a depending tubular extension 67 which extends through and is slidably mounted in the lower cylinder head 57 and is provided with an upwardly extending cylindrical barrel portion 70 which is slidably mounted in the extension 61 of the piston 60. A neck plunger 71 is removably secured to the upper end of the barrel portion 70 by means of a split collar 72 and is adapted to project through the plunger ring 63 and partially into the neck portion of the blank mold to form an initial blowing opening in the neck of the blank. The lower end of the sleeve 62 extends into the upper portion of the cylinder 55 and constitutes an adjustable abutment for limiting the upward travel of the pistons 60 and 66 and the elements carried thereby, relative to the blank mold. The space between the pistons 60 and 66 communicates with the interior of the blank mold through grooves or passages 73, 74, 75 and 76 formed in the extension 61, split ring 72, and plunger ring 63 respectively.

At the commencement of a molding operation the neck plunger 71 is elevated by admitting fluid under pressure into the cylinder 55 beneath the lower piston 66, through a pipe 77. When the piston 66 is thus raised to elevate the neck plunger 71 to operative position, the base of this plunger engages the plunger ring 63 and elevates it also into operative position simultaneously therewith (Fig. 10). The raising of the plunger ring 63 also raises the piston 60, which is connected therewith, until its movement is arrested by engagement with the end of the sleeve 62. The pressure that is admitted beneath the piston 66 is preferably lower than the other operating pressures of the machine and is derived from a separate source, as will be hereinafter described.

As soon as the plunger ring and neck plunger are thus elevated and a mold charge is delivered to the blank mold, suction is applied to the space between the pistons 60 and 66 through a pipe 80 communicating with pipes 81 and 82 which respectively provide suction and blowing pressure to the blank mold (Fig. 4). This suction is transmitted through the passages 73, 74, 75 and 76 to the blank mold, and sucks or draws the glass downwardly into the neck portion of the blank mold and causes it to settle around the neck plunger 71 to form the outside finish of the neck of the bottle and the initial blowing depression therein. As soon as this operation is concluded, the pressure beneath the piston 66 is relieved and pressure is applied through the pipe 80 above this piston. This pressure maintains the piston 60 and plunger ring 63 in raised positions but forces the piston 66 downwardly and lowers the neck plunger 71 to a retracted position with respect to the neck of the blank. Upon the withdrawal of the neck plunger 71, the pressure between the pistons 60 and 66 is transmitted to the mold through the passages mentioned and counterblows the charge to form a completed parison. It will be noted, in this connection, that the pressure that maintains the piston 60 and plunger ring 63 in an elevated position and forces the piston 66 downwardly to lower the neck plunger 71, is the same pressure that supplies counter-blowing pressure to the mold charge.

At the conclusion of the counterblowing operation, the counterblowing pressure between pistons 60 and 66 is exhausted and pressure is exhausted in cylinder 13, thereby permitting the blank mold to be opened by springs 27, leaving the completed blank supported between the cover plate 32 and the plunger ring 63. During this time, the pressure in cylinder 42 above the piston 43 is exhausted and the cover plate 32 is thereby permitted to be moved upwardly very slightly by the springs 46 permitting the blank mold to be opened without undue friction of the cover plate 32 against the depression 33 in the upper end of the blank mold. The blow mold, in an opened position, is then swung over toward a position about the blank and substantially simultaneously therewith, pressure is admitted to the lower end of the cylinder 42 through the pipe 44 to move the cover plate 32 upwardly and laterally as above described to take it out of the way of the blow mold in its movement toward the opened blank mold and parison. The blow mold then completes its swing to a position about the parison and closes, it being understood that the sections of the blank mold are opened a sufficient distance to permit the opened blow mold to enter therebetween. As soon as the blow mold is closed about the blank, pressure is admitted to the upper end of cylinder 55 above the piston 60 through the pipe 83 which causes the piston 60 to descend and to lower the plunger ring 63 out of supporting engagement with the formed blank. The blow mold is then reverted, carrying the blank or parison with it to the finish blowing station. The mechanism which controls the timing of the settling suction, the counterblow and the application of the several operating pressures will be hereinafter described.

The blow or finishing mold 2 is invertible, and is adapted to be oscillated about a horizontal axis between a neck-down position at the blank-forming station, and a neck-up position at the finish-blowing station to transfer a blank from the former to the latter as previously described. This mold comprises two cooperating sections 84 which are detachably secured to mold holders 85 (Figs. 7, 12 and 13). The mold holders are hinged upon a pin 86 which is carried by a housing 87 having trunnions 90 at each end thereof which are mounted for rocking movement in bearings 91 provided on the side frame elements 3.

The mold holders 85, as best shown in Fig. 5, are offset relative to the horizontal plane passing through the axis of swinging movement, whereby the blank is transferred from the blank-forming station to the finish-blowing station with the longitudinal axis thereof disposed substantially tangentially to the arc described by the center of gravity of the blank during the transferring operation. By thus arranging the parts, the force which impels the blank is applied to the blank at an angle to the longitudinal axis thereof rather than in the direction of the axis as heretofore.

Throughout this movement the line of action of the impelling force exerted by the blow mold falls outside the center of gravity of the parison, thereby producing a moment tending to revolve the parison about its own center of gravity, and thus invert it. Furthermore, the force of gravity tending to distort the blank laterally is balanced by the centrifugal force incident to the swinging of the carrier and the blow mold, and this balance between gravity and centrifugal force may be accurately maintained by suitably accelerating or decelerating the speed at which the carrier is swung.

The foregoing may be more readily understood by referring to Fig. 19a of the drawings, which is a composite diagrammatic view illustrating the method of the present invention, wherein a blank $a$ is swung about a horizontal axis $x$ from a blank-forming station BF to a finish-blowing station FB, in comparison with the prior method of transferring a blank $b$ between these stations. It will be observed that the impelling force F, and the inertial reaction I of the parison $a$ through its center of gravity form a couple tending to start the parison rotating about its center of gravity $m$. In the case of the blank $b$ in which the transferring means is not offset, the impelling force F' and the inertial reaction I' are in the same straight line, and therefore do not form such a couple. The rotation of the blank $b$ about its center of gravity must be caused by a couple transmitted through the neck which tends to distort the neck in its plastic condition. It will be apparent that the blank $a$ is in a similarly favorable condition during deceleration, the retarding force exerted by the neck ring and the inertial force acting through the center of gravity of the parison forming a couple which tends to check the revolution of the parison about its center of gravity, and thus bring it to rest when the transfer is completed.

The time of transfer is so regulated that the centrifugal force just balances the gravitational force as follows:

Referring to Fig. 19a, let $m$ be the mass of the parison and $l$ the distance of the center of gravity from the point of support. Also $\theta$ is the angle through which the blank has revolved, $w$ is the angular velocity and $r$ the radius to the center of gravity. Then the centrifugal force is $mw^2r$, and its moment about the neck ring is $mw^2rl$. Similarly, the moment of the force of gravity about the neck ring is $mgl \sin \theta$. If the effect of gravity is to balance the centrifugal effect, these must be equal, hence $mw^2rl=mgl \sin \theta$ or $$w=\sqrt{\frac{g}{r}}\sqrt{\sin \theta}$$

In accordance with the usual notation $$w=\frac{d\theta}{dt}$$

hence $$t=\sqrt{\frac{r}{g}}\int \frac{d\theta}{\sin \theta}$$

On computing the integral, the angle $\theta$ may be found as an elliptic function of the time, and the motion properly designed to produce the transfer without distortion, the radius being related to the period of transfer by the equation $r=1.169T^2$.

If the blank is transferred by a blow mold, as in the present instance, and if the blank is bent to one side, that side of the blank will contact with the wall of the mold and become chilled. In the type of machines in which the blank is transferred by means of a neck ring, the blank may become distorted to such an extent as to be imperfectly positioned in the blow mold.

The blow mold is opened and closed at proper times by means of fluid pressure which is admitted to a vertically disposed cylinder 92 through pipes 93 and 94 (Figs. 4 and 5). These pipes are respectively provided with valves 95 and 96 by means of which the pressure delivered to the cylinder may be regulated as desired. The cylinder 92 is mounted on the base 4 of the shaping machine and is provided with a piston 97 which is carried by a piston rod 100 (Fig. 6). The piston rod 100 extends entirely through and is slidably mounted in both of the heads of the cylinder. The cylinder 92 is so disposed that the piston rod 100 thereof is in alignment with a mold opening member in the form of a rack bar 101 which is slidably mounted in the housing 87 for movement in opposite directions. The rack bar 101 meshes with a spur gear 102 which is fixed to a horizontal shaft 103 (Figs. 12 and 13). The shaft 103 is journaled in the housing 87 and is provided with a spiral gear 104 adjacent to each end thereof. The spiral gears 104 mesh with spiral gears 105 which are fixed to vertical shafts 106. The shafts 106 extend entirely through the housing 87 and are provided at each end with a crank 107 which are connected to the sections 84 of the blow mold by means of links 110. The cranks 107 and the links 110 together form a toggle connection adapted to lock the sections of the mold in a closed position during the blowing operation. The connections between the links and the sections of the blow mold comprise pins 108 which extend through eccentric bushings 109. These bushings are mounted for rotary adjustment in the sections of the blow mold and insure that the sections of the mold form proper contact when closed.

With reference to Figs. 5, 12 and 13, in which the blow mold is shown as occupying a closed position with the rack bar 101 and piston rod 100 at the limit of their downward strokes, it will be apparent that at the completion of a blowing operation, the application of pressure beneath the piston 97 will elevate the piston rod 100 into abutting engagement with the lower end of the rack bar 101 and raise the same to the position shown in dotted lines in Fig. 5, in which position it projects upwardly from the housing 87. As the rack bar 101 is raised, the gear 102 will be rotated, causing the rotation of the spiral gears 104 and the partial rotation of the spiral gears 105 and shafts 106. This partial rotation of the shafts 106 will cause the cranks 107 to swing upon their axes and to open the blow mold through the medium of the connecting links 110.

As soon as the blow mold is thus opened and the blown ware removed therefrom, the blow mold is swung upwardly and over to a position in which it may be closed about a blank, the blank mold being open at this time. This swinging movement of the blow mold is effected by fluid pressure which is admitted to a horizontally disposed cylinder 111 (Figs. 5 and 6) through pipes 112 and 113. Check valves 114 and 115 are provided in the pipes 112 and 113 respectively and are disposed in such position as to direct the flow of air exhausted from the cylinder through by-pass pipes 116 and 117 which are respectively provided with flow-regulating valves 120 and 121 (Fig. 4). By adjusting the valves 120 and 121 the exhaust from the cylinder may be controlled as desired. The pipes 112 and 113 communicate directly with passageways 122 and 123 which extend axially through each end of a stationary piston rod 124 and communicate with the interior of the cylinder adjacent to each side of a piston 125 (Fig. 5). The piston rod 124 is supported at each end by depending brackets 126 which are carried by the base 4. The cylinder 111 is slidably mounted on the piston rod 124 and is provided with a track 127 which rides upon a roller 130 mounted on a shaft 131 (Figs. 5 and 6). A rack bar 132 is fixed to the upper side of the cylinder 111 and meshes with a segmental gear 133 which is mounted on a shaft 134. The shaft 134 is carried by a bracket 135 which is, in turn, carried by the base 4.

The segmental gear 133 is formed with an arm 136 which is provided with a roller 137 for engagement with a track 140 provided on an arm 141. The arm 141 is pivotally mounted at its lower end upon the shaft 131 and is provided at its upper end with a segmental rack 142. This rack meshes with a segmental gear 143 which is fixed to the blow-mold housing 87 and is provided with an arm 144 for engagement with stop pins 145 and 146. These pins are carried by one of the side elements 3 and arrest the swinging movement of the blow mold at the blank forming and finish blowing stations.

By again referring to Fig. 5, it will be apparent that when fluid under pressure is admitted to the cylinder 111 through the pipe 112, the cylinder will be forced rearwardly (to the right in Fig. 5) and will cause the arm 136 to rock upwardly and forwardly through the medium of the rack bar 132 and the segmental gear 133. This movement of the arm 136 will cause the arm 141 to swing in a forward direction and swing the blow mold upwardly and rearwardly, through the medium of the segmental rack 142 and gear 143, until its movement is arrested by the arm 144 engaging the stop pin 146. When the blow mold occupies this inverted position, the rack bar 101 extends downwardly with its lower end, which was previously its upper end, adjacent to the upper end of the piston rod 100, the rod 100 by this time having been lowered to permit the rack bar 101 to swing into alignment therewith. Upon the succeeding upward movement of the piston rod 100, the rack bar 101 will be again raised through the housing, but by reason of the fact that it is inverted, will actuate the several parts in a reverse direction to close the blow mold about a blank.

It will be apparent from the foregoing that the blow mold transfers the blank or parison from the blank forming station to the finish blowing station, and that the blank is inverted from a neck-down position at the blank forming station to a neck-up position at the finish blow station during such transfer.

When the blow mold occupies a position at the blowing station (Figs. 5 and 11) its lower portion is closed by a bottom plate 147 which is supported by a holder 150. This holder is slidably mounted in a clamp 151 which is carried by the base 4. The bottom plate 147 may be adjusted vertically with respect to the blow mold by loosening the clamp 151 and manipulating an adjusting nut 152 which is threaded onto the holder 150 and rests upon the top of the clamp 151.

The upper portion of the blow mold, when at the blowing position, is closed by a blow head 153 (Fig. 11) which is detachably secured to a hollow arm 154 by a suitable bayonet joint connection 155. The blow head is provided with an opening 156 which registers with a nozzle 157 formed on the arm 154 and is maintained against displacement, by means of a spring 160, but at the same time is free to move sufficiently to make a proper contact with the top of the blow mold. As shown in Fig. 5, the arm 154 is adjustably secured to the lower end of a piston rod 161 which extends upwardly through heads 162 and 163 of a fluid pressure cylinder 164 and is provided with a piston 165. This cylinder is carried by one of the side frame elements 3 and is supplied with fluid under pressure at points above and below the piston 165 through pipes 166 and 167 respectively. A plurality of springs 170 are suitably seated in the lower cylinder head 163 and tend to maintain the blow head 153 out of frictional contact with the blow mold when pressure in the cylinder 164 is exhausted, by providing a resilient support for the piston 165.

Blowing pressure is delivered to the blank in the blow mold through a pipe 171 which communicates with an annular recess 172 provided in the upper cylinder head 162. When the blow head is in operative position, the recess 172 communicates with a passageway 173 which extends axially through the piston rod 161 and communicates at its lower end with the interior of the hollow arm 154.

The upper portion of the piston rod 161 extends into a housing 174 which is formed on the upper cylinder head 162 and is provided with a spiral slot 175 for engagement by a pin or roller 176 carried by the piston rod 161. As the piston 165 rises to elevate the blow head at the completion of a blowing operation, the slot 175, acting on the pin 176, imparts a partial rotation to the rod 161 sufficient to swing the blow head in a lateral direction out of the path of the blow mold as it swings upwardly on its travel back to the blank-forming station.

Delivering mechanism (B)

The delivering mechanism B which conveys the mold charges to the several shaping machines A is supported by a suitable frame structure 180 (Fig. 1) and comprises a funnel element 181 and a plurality of guideways 182 which extend radially from the funnel element to the several shaping machines (Figs. 2 and 3). The funnel 181 is supported by a bracket 183 beneath an outlet 184 in the forehearth 185 (only a portion of which is shown in Fig. 1) of a glass feeding mechanism that is adapted to deliver molten glass in successive mold charges of predetermined size and shape, which are cut off by suitable shear device 186. The surface of the funnel is lubricated by air or steam under pressure which is projected over the surface thereof from an annular chamber 187 mounted on the upper edge of the funnel. The lubricating fluid under pressure is supplied to the chamber 187 from a pipe 190 which leads from a convenient source of supply and is provided with a flow-regulating valve 191 (Fig. 4).

Each of the guideways 182 comprises a horizontally reciprocable trough section or distributor 192 which intercepts the mold charges issuing from the funnel 181, a vertically adjustable trough section 193 which conveys the mold charges to the shaping machine, and a laterally adjustable deflector 194 which directs the mold charges accurately into an awaiting mold (Fig. 1).

Each of the distributors 192 is carried by a bracket 195, which is mounted upon one end of a horizontal reciprocable piston rod 196. The piston rod 196 extends entirely through a fluid pressure cylinder 197, which is mounted upon a bracket 200 carried by a transversely extending supporting beam 201 which is mounted upon the frame structure 180 and which constitutes a support for all the cylinders 197. The piston rod 196 is prevented from rotating and displacing the trough 192 by means of a pin 202 which extends transversely through the other end of the piston rod 196 for engagement with slots 203, provided in a tubular housing 204 formed on one of the heads of the cylinder 197. The trough section 192 is projected in a rectilinear path to a position beneath the funnel 181 and in alignment with the trough section 193 in order to deliver a mold charge to the shaping machine, by means of fluid pressure, which is admitted to the cylinder 197 from a pipe 205 (Figs. 1 and 4). The pipe 205 may be provided with a valve 206 in order to regulate the admission of air to the cylinder 197 and the operating speed of the trough 192. At the conclusion of a delivery operation, and as soon as the pressure within the cylinder 197 has been relieved, the trough section 192 is withdrawn from operative position with respect to the funnel 181 and the trough section 193, by means of a spring 207, which is secured at one end to the piston rod 196 and at the other end to the cylinder 197. This spring positively maintains the trough section 192 in a retracted position with respect to the outlet of the feeder when the operation of the machine is discontinued or in the event of failure in the pressure supply to the cylinder 197. It will be understood in this connection that the troughs 192 of the several guideways operate in succession and in timed relation with respect to the action of the feeding device in order to deliver mold charges successively to the several shaping machines.

Each of the trough sections 193 is detachably hinged at its upper end to a transversely extending beam 210, as at 211, and is supported at its lower end for vertical adjustment by a screw 212 carried by a bracket element 213. The bracket element 213 is suitably secured to the upper end of the deflector 194. The deflector 194 is provided with an arcuate flange 214 which is secured to a supporting plate 215 by means of suitable clamping bolts 216. These bolts may be loosened and the deflector swung laterally about the axis of a mold in order to adjust its upper end with respect to the trough 193. The plate 215 is adjustably secured to the lower end of a bracket 217 which is carried by the tubular brace 5, through the medium of a bolt 220 and an intermediate plate 221. The plate 215 is keyed to the plate 221 for sliding movement in a longitudinal direction as at 222 (Fig. 6), and the plate 221 is keyed to the bracket 217 for movement in a lateral direction, as at 223 (Fig. 5). It will be apparent that by loosening the bolt 220 the plate 215 may be shifted horizontally in directions transversely to each other in order to properly align the lower end of the deflector 194 with the blank mold. A chute 224 is carried by the frame 180 with its upper end in position beneath the funnel 181 and the outlet of the feeding mechanism, and is adapted to receive mold charges issuing from the feeding mechanism and convey them to a dump or cullet pit in the event that none of the troughs 192 are in position to intercept them.

*Initial blowing mechanism (C)*

In certain instances it may be desirable to commence the operation of blowing a bottle by initially delivering to the blank or parison a succession of relatively short discontinuous blows or puffs which approximate the practice of a glass blower when ware is produced manually. This initial blowing operation imparts to the blank a symmetrical initial configuration and tends to produce ware having a uniform wall thickness when completely blown. This action is effected through the medium of the intermittent initial blowing mechanism C, which embodies in its construction a vertically disposed cylinder 225 which is mounted upon the framework 180 at any convenient point (Figs. 20, 21 and 22). The cylinder 225 is supplied with fluid under pressure through pipes 226 and 227 which are respectively provided with pressure regulating valves 230 and 231. A piston rod 232 reciprocates in the cylinder 225 and is provided with a piston 233. The piston rod 232 is slidably mounted in bearings 234 which are carried by a bracket 235 provided on the upper head of the cylinder 225. A rack 236 is provided on the upper portion of the piston rod 232 for engagement with a gear 237 which is loosely mounted upon a shaft 240. The shaft 240 is journaled in bearings 241 which are carried by a bracket member 242 that extends outwardly from the bracket 235. The gear 237 is provided with a hub portion 243 which is provided with an arm 244 upon which a pawl 245 is pivotally mounted for engagement with a toothed arm 246 that is fixed to the shaft 240. The pawl 245 is biased inwardly for operative engagement with the arm 246 by means of a spring 247.

An air pump cylinder 250 is mounted on the side of the cylinder 225 by means of a bracket 251, and is provided with a piston 252 which is carried by a piston rod 253. A pipe 254 establishes communication between the space within the cylinder 250 beneath the piston 252 and the pipe 171 which supplies blowing pressure to the blow mold (Fig. 4). Air is admitted to and exhausted from the interior of the cylinder 250 above the piston 252 through a port 255 which communicates with the outside atmosphere. Air is drawn into the lower portion of the cylinder 250 upon the upward stroke of the piston 252, either from the pipe 171 or from the outside atmosphere through the blowhead 153, the latter being in a raised position at such time. In instances where the preliminary blowing mechanism is employed, a check valve 261 is provided in the pipe 171, as shown in Fig. 4, to prevent the air from escaping through this pipe.

The piston rod 253 is splined for sliding movement in a bearing 262 carried by the upper head of the cylinder 250, and is provided at its upper end with a roller 263 for engagement with a cam plate 264 which is fixed to the shaft 240. A spring 265 surrounds the piston rod 253 and yieldably maintains the roller 263 in engagement with the cam plate 264. The plate 264 is provided with a plurality of rectilinear cam faces 266 which are formed at successively increasing distances from the axis of rotation of the cam. It will be observed, in this connection, that the cam faces 266 at their lines of intersection with each other, are further remote from the axis of rotation of the plate than are the intermediate portions thereof and as a result, a succession of downward thrusts will be imparted to the piston 252 as the intersections of the faces 265 successively engage the roller 263. The piston 252 will, however, rise slightly under the action of the spring 265, as the intermediate portions of the faces 266 successively traverse the roller 263, which action withdraws a certain amount of the air that was previously delivered to the blank and not only provides for the expansion of the air by contact with that hot blank but successively contracts or partially collapses the blank. This successive and progressive expansion of the blank, together with the intervening periods of slight contraction thereof kneads of works the wall portions to a substantially uniform thickness prior to the finish blowing operation.

By thus inaugurating the finish blowing operation by delivering air to the blank in a series of impulses or pulsations, the thickest portions of the walls of the blank, which are of higher temperature and flow more readily, are first reduced in thickness. During the period of time elapsing between the delivery of the successive increments of air, the portions of the walls of the blank which were thus reduced in thickness lower slightly in temperature and approach the temperature of the wall portions which were initially of less thickness. As a result, the wall portions of the blank are of approximately the same thickness and temperature by the conclusion of the intermittent blowing operation, so that when the steady finishing blow is applied, the blank will expand evenly in all directions with walls of substantially uniform thickness.

On the down-stroke of the piston 233, the arm 246 passes by the pawl 245 without rotating the gear 237, and therefore without actuating the puff-blowing piston 252.

*Take-out mechanism*

The take-out mechanism D which removes the ware from the blow mold at the completion of the finish blowing operation and conveys it to another apparatus for further treatment, herein shown as comprising a leer 267 and a cooperating conveyor 270 is illustrated in Figs. 1 and 23 to 31. It embodies in its construction a cylinder 271 which constitutes the base of the mechanism, and which is supplied with fluid under pressure through pipes 272 and 273. Valve elements 274 and 275 (Fig. 4) are provided in these pipes for controlling the operating speed of the mechanism. A piston 276 operates within the cylinder 271 and is provided with a piston rod 277 which is slidably mounted in bearings 280 provided on a column 281. This column is mounted on the cylinder 271 and supports a housing 282 within which upper and lower spur gears 283 and 284 are rotatably mounted.

The gears 283 and 284 are recessed on one side to receive bearing disks 285 and 286 (Fig. 25) upon which they are mounted by means of interposed ball bearings 287 and 290. The disks 285 and 286 are secured to the housing 282 in any preferred manner and are properly centered thereon by means of pins 291 and 292. The gears 283 and 284 may be removed from their mountings by detaching rings 293 and 294 which are carried thereby and which constitute portions of the ball bearing race-ways. By means of this construction, the gears 283 and 284 are provided with bearings having relatively small axial dimensions and relatively large radial dimensions which will effectively resist lateral strains.

The upper gear 283 is formed with a relatively short hub portion 295 upon which a holder 296, having an arm 297 fixed therein, is slidably mounted for radial adjustment by means of bolts 300, which engage slots 301 provided in the holder (Fig. 23). The holder 296 is formed with a diametrically disposed tongue or key portion 302 which slidably engages a groove 303 in the hub 295 and prevents the holder and the arm 297 from rotating relative to the gear 283. The lower gear 284 is provided with a relatively long hub portion 304 upon which a holder 305, having an arm 306 fixed therein, is mounted for rotary and radial adjustment by means of bolts 307 which extend through slots 310 and 311 that are respectively provided in the holder 305 and in an intermediate plate 312. The holder 305 is also provided with a tongue or key 313 which slidably engages a groove 314 in the plate 312, and the latter is provided with a stud portion 315 which rotatably engages an axial opening 316 in the hub 304. By loosening the bolts 307, the holder 305 may not only be moved radially on the plate 312, in order to adjust the radius of swing of the arm 306 equal to that of the arm 297, but the holder may be turned together with the plate 312 relative to the gear 284 in order to adjust the arm 306 parallel to the arm 297. This latter adjustment is generally made when the machine is originally assembled, and the respective parts are fixed in their adjusted position by means of a pin 317, which permanently secures the plate 312 to the hub 304. It will be observed, from an inspection of Fig. 25, that by means of the difference in the lengths of the hub portions 295 and 304 of the gears 283 and 284, the arms 297 and 306 swing in different vertical planes, in order to permit their passage by each other during their travel between the blow mold and the conveyor. On account of the large radial dimensions of the bearings for the gears 283 and 284 mentioned above, any lateral strains encountered by the arms 297 and 306 are effectively resisted.

The gears 283 and 284 are rotated in the same direction by means of a rack bar 320 which is slidably mounted for vertical movement in a guideway 321, which is formed integrally with the housing 282. The lower end of the rack bar 320 is adjustably secured to the upper end of a rod 322 by means of a clamp 323. The lower end of the rod 322 is slidably mounted in a guideway 324 adjacent to the cylinder 271. The rack bar 320 is raised and lowered in order to rotate the gears 283 and 284 and to swing the arms 297 and 306 carried thereby, by means of an arm 325, which is secured to the piston rod 277 and which projects outwardly through a slot 326 in the column 281. The upward and downward movement of the several parts is cushioned by means of a spring 327 which surrounds the lower end of the rack bar 320 between the lower end of the guideway 321 and the clamp 323 and a spring 330 which surrounds the rod 322 between the arm 325 and the guideway 324.

A rod 331 is mounted for vertical adjustment in a sleeve 332 and in a clamp 333 which are pivotally mounted upon the arms 297 and 306 respectively, and is provided at its lower end with an extension 334 (Figs. 26 and 27) upon which is slidably mounted a tongs actuating member, herein shown as a sleeve 335. The sliding movement of the sleeve 335 is limited by means of a pin 336 which is fixed in the extension 334 and extends through slots 337 in the sleeve. A pair of bifurcated cross levers 340 straddle the sleeve 335 and are pivotally mounted intermediate of their extremities upon the pin 336. Opposed fingers or tongs 341 are removably secured to the lower ends of the levers 340 and cooperate with a steadying pin 342, which is detachably secured to the extension 334, in gripping the neck of a bottle. The upper extremities of the levers 340 are provided with slots 343 for engaging pins 344 which are carried by ears 345 formed on the sleeve 335. When the sleeve 335 is slid upwardly on the extension 334, the arms 340 will be actuated to close the tongs 341, and when the sleeve is slid downwardly, the tongs will be opened. The tongs 341 are yieldably maintained in either of these positions by means of a suitable spring detent 346 that is carried by the sleeve 335 for engagement with upper and lower grooves 347 and 350 respectively, which are formed in the extension 334.

The sleeve 335 is moved relatively to the extension 334 in order to respectively open and close the fingers 341, by means of a rod 351, which is connected at its lower end to one of the pins 344. This rod extends parallel to the rod 331 and is slidably mounted adjacent to its upper end in a guideway 352 which is carried by the sleeve 332 (Fig. 23). An arm 353 is adjustably secured to the rod 351 for engagement with a stop pin 354 which is fixed in the path of the arm 353 in any convenient manner, not shown.

When the take-out device is actuated to remove a bottle from the blow mold, fluid pressure is admitted into the lower portion of the cylinder 271, which raises the rack bar 320 and rotates the gears 283 and 284, thereby swinging the tong mechanism in a clockwise direction, Fig. 23, until the arm 353 engages the pin 354 and arrests the downward movement of the rod 351 and the sleeve 335. The rod 331 and the extension 334, however, continue to move downwardly a distance equal to the length of the slots 337 and the fingers 341 are thereby closed about the neck of the bottle. This continued downward movement of the extension 334 after the movement of the sleeve 335 has been arrested, forces the lower groove 350 out of engagement with the detent 346 and carries the upper groove 347 into engagement therewith. As soon as the ware is thus engaged by the fingers 341, the movement of the transferring mechanism is reversed by admitting fluid pressure into the upper portion of the cylinder 271 and the rod 331 is raised and swung to the delivery point, the detent 346 through engagement with the upper groove 347 preventing the fingers 341 from releasing the ware during such movement. The fingers 341 are opened to deposit the ware on the conveyor 270 by means of a spring latch 355 which is suitably mounted upon the leer 267. This latch engages above an arm 356 which is formed on the sleeve 335 and prevents the same from rising upon the upward movement of the rod 331 until the fingers 341 have been opened to release the ware. At this time, an arm 357 which is carried by the rod 331, engages the latch 355 and forces it out of the path of movement of the arm 356. As soon as the latch 355 has thus released the arm 356, the sleeve 335 rises with the rod 331 in its return movement to the blow mold. As the rod 331 rises, during the period of time that the sleeve 335 is maintained stationary by the engagement of the latch 355 with the arm 356, the groove 347 is forced out of engagement with the detent 346 and the groove 350 moved into engagement therewith. The fingers 341 are, therefore, maintained in an open position during their travel back to the blowing station and in position to again close about the neck of a succeeding bottle.

Adjustment to operate between different levels

The take-out device may be adjusted to transfer ware between points at the same or different levels. For example, the leer conveyor 270 may be located at the same level as the bottom plate 147 of the blow mold, as is diagrammatically illustrated in full lines in Fig. 31. In such instance, the lower arm 306 of the transfer device travels through the arc A B in transferring ware from the blow mold to the leer. At each extreme limit of travel of the arm 306 through this arc, the arm occupies a horizontal position with its extremity located at a distance above the top of the ware, and with the rod 331 adjusted to enable the fingers 341 to operatively engage and disengage from the neck of the ware. It may, however, occur that the leer conveyor is located at a lower level than that of the bottom plate 147, as is illustrated in dotted lines in the figure mentioned. In such instance the arc of travel A B of the arm is shifted in a counter-clockwise direction to the position C D. This adjustment is effected by loosening the clamp 323 and lowering the rack bar 320 with respect to the piston 276 and its directly associated parts. When the arc of travel of the arm 306 has been thus shifted, the extremity of the arm at each extreme limit of travel thereof occupies a position above the top of the ware, and at a distance therefrom which is greater than such distance before adjustment. The rod 331 is, therefore, lowered when the arc of travel of the arm is thus shifted, in order to operatively position the fingers 341 relative to the neck of the ware. This adjustment is effected by loosening the clamp 333 and sliding the rod 331 downwardly through the clamp and the sleeve 332. Conversely, the transfer mechanism may be adjusted to convey ware to a delivery point which is located at a level above that of the bottom plate 147 by reversing the adjustments above described. When the arc of travel of the arm 306 of the transfer mechanism is shifted, in order to deliver ware between points at different levels, the radius of swinging movement of the arms is correspondingly increased or decreased by loosening the bolts 300 and 307 and adjusting the arms 297 and 306 in radial direction.

Pressure control mechanism

The operation of the different mechanisms of each of the individual shaping machines, together with the devices which operate in conjunction therewith, is separately controlled by individual valve mechanisms which coordinate the operation of the machine as an entirety and which insure that the various functions, performed thereby, occur in proper sequence and in timed relation with respect to each other. These control mechanisms are illustrated in Figs. 4 and 32 to 37.

Each of these mechanisms embodies a valve chest 360 and a coacting valve operating drum or cylinder 361 which is rotated in timed relation to the operation of the feeding device. The valve chest is provided with a chamber 362 (Fig. 32) with which communicate all of the pipes which deliver fluid pressure to the operating cylinders of the shaping machine, with the exception of the pipes 77, 81, 82 and 171. The chamber 362 is supplied with fluid pressure from a suitable source of supply, through a pipe 363. The transmission of operating pressure through the various delivery pipes is controlled by a series of similar valve mechanisms 364 (Fig. 33) which are provided in the valve chest 360, and which are opened and closed in sequence by the drum 361, in a manner hereinafter to be described. Inasmuch as all of the valve mechanisms 364 are of similar construction, and are operated in substantially the same manner, the valve which controls the supply of pressure to the mold closing cylinder 13 will be described as an example.

As shown in Fig. 33, the delivery pipe 16 of the cylinder 13 communicates directly with a vertical port 365 which communicates at its lower end with the chamber 362, and at its upper end with the outside atmosphere. Upper and lower valve members 366 and 367, which are carried by a valve stem 370, respectively control communication between the port 365 and the outside atmosphere and between this port and the chamber 362. A spring 371 yieldably supports the valve 367 and tends to maintain this valve in a closed position with the valve 366 open. The valve stem 370 is preferably provided with a plurality of radially disposed ribs 372 which maintain the valves 366 and 367 properly centered with respect to the port 365 and provide passageways therebetween to permit pressure in the cylinder 13 and pipe 16 to exhaust to the atmosphere at the proper time, through the valve 366. The valves 366 and 367, and also the spring 371, may be removed from the valve chest 360 by removing a screw plug 373 which is provided in the bottom of the chamber 362. The valves 366 and 367 are depressed in order to establish communication between the fluid pressure chamber 362 and the pipe 16 and to disestablish communication between this pipe and the outside atmosphere, by means of a lever 374. This lever is pivotally mounted in any suitable manner upon the valve chest 360 for engagement with the upper valve member 366, and is provided with a cam portion 375 for engagement by a relatively short stud 376, which is carried by the continuously rotating drum or cylinder 361, the construction and operation of which will be hereinafter described. As the drum 361 rotates, the stud 376 is carried into engagement with the cam 375 and depresses the lever 374. This movement of the lever 374 closes the valve 366 and opens the valve 367 against the action of the spring 371. The lever 374 is maintained in a depressed position, with the valves 366 and 367 in the positions described, by means of a spring-pressed latch member 377, which is pivotally mounted upon the valve chest 360 and is adapted to engage over the end of the lever 374 when the latter is depressed. When the valves 366 and 367 are thus actuated, pressure is transmitted from the chamber 362 to the cylinder 13 through the valve 367 and pipe 16. The stud 376, while being of sufficient length to actuate the lever 374 is not, however, of sufficient length to trip the latch 377 (Fig. 34).

The latch 377 is moved from locking engagement with the end of the lever 374 after the desired interval of time, by means of a relatively long stud 380, which is also carried by the drum 361. This stud, being of greater length than the stud 376, engages the cam 375 and in passing thereover it further depresses the lever 374 slightly as shown in Fig. 35, so as to enable the stud 380 to pass by the cam 375. As the stud 380 moves from engagement with the cam it engages the latch 377 and moves the same out of locking engagement with the lever 374. The release of the lever 374 permits the spring 371 to close the valve 367 and to open the valve 366, thereby interrupting the supply of fluid pressure to the cylinder 13, and at the same time permitting the pressure in this cylinder to exhaust to the atmosphere through the valve 366.

The pipes 81 and 82 which deliver settling suction and counter-blowing pressure to the blank mold, the pipe 171 which delivers the finish-blowing pressure to the blow mold, and the pipe 77 which supplies reduced operating pressure to the lower portion of the cylinder 55, respectively communicate with separate chambers 381, 382, 383 and 388 (Fig. 32). These chambers are also provided in the valve chest 360 and are respectively supplied with settling suction, counter blowing and finish blowing pressures and reduced operating pressure through pipes 384, 385, 386 and 389. The transmission of the settling suction and the blowing pressures through the delivery pipes mentioned, is controlled by valve mechanisms 387, 390, 391 and 398 (Fig. 4) which are provided in the valve chest 360, and which are opened and closed in proper sequence and in timed relation with respect to the valves 364, by actuating mechanism hereinafter to be described.

The valve mechanisms 391 and 398 which respectively control the transmission of the finish blowing pressure and reduced operating pressure to the cylinder 55 are of similar construction and operate in the same manner as the valves 364, previously described, but the valves 387 and 390 which control the settling suction and the counter blowing pressure differ therefrom in several respects. The construction and operation of the valves 387 and 390 are, however, similar to each other and a description of one of these valves is, therefore, believed to be sufficient.

Referring to Fig. 33, the pipe 384, which supplies settling suction to the chamber 381, communicates directly with a vertical port 392, which, in turn, communicates at its lower end with the chamber 381. A valve member 393 which is carried by a stem 394 controls communication between the port 392 and the chamber 381 and is yieldably supported by a spring 395. The valve stem 394 is preferably provided with a plurality of spaced collars 396 which not only maintain the valve 393 in a properly centered position, but prevent communication between the port 392 and the outside atmosphere. The upper end of the valve stem 394 projects upwardly through the port 392 and is provided with an actuating knob 397. The valve member 393 is opened at the proper time to apply suction to the blank mold through the pipe 81, by means of mechanism similar to that which actuates the valves 364. This mechanism comprises a lever 400 which is pivotally mounted in any suitable manner upon the valve chest 360 for engagement with the knob 397, and is provided with a cam portion 401 for engagement by a relatively short stud 402, which is carried by the drum 361. As the drum 361 rotates, the stud 402 engages the cam 401 and depresses the lever 400 which in turn opens the valve 393 against the action of the spring 395. The lever 400 is maintained in a depressed position by means of a latch member 403 (Fig. 34) similar to the latch 377 shown in Figs. 34, 35 and 36, which is pivotally mounted on the valve chest 360 and which engages over the end of the lever 400 when the latter is depressed. The lever 400 is released at the proper time, in order to discontinue the settling suction, by means of a relatively long stud 404, which is also carried by the drum 361. As this stud is carried into engagement with the cam 401, the lever 400 will first be further depressed slightly, and then, as the stud passes from engagement with the cam, it engages and trips the latch 403, allowing the valve 393 to close under the action of the spring 395. As soon as the settling operation has been completed and the valve 393 has been closed, the valve 390 is actuated to apply counter blowing pressure to the blank through the pipes 82 and 80. The duration of time between the opening and the closing of the different valves is determined by the peripheral speed of the drum and the distance between the valve opening and valve closing studs. While the rotational speed of the drum is governed by the action of the feeding device, as will presently be described, the desired spacing of the studs may be easily obtained for the reason that practically the entire surface of the drum may be provided with threaded apertures 405 (Fig. 37) into which the various studs may be screwed in practically any desired relative position or distance apart, or it may be found desirable to mount the studs in T-shaped slots 408 provided in the periphery of the drum. In such construction a very accurate adjustment of the studs may be obtained and also the adjustments may be made while the drum is rotating.

Each of the valve actuating drums 361 comprises a cylindrical shell 406 which is rotatably mounted upon a common shaft 407 by means of supporting disks 410 and which is maintained against axial displacement by collars 411 which are fixed to the shaft adjacent to the disks 410. The shaft 407 is journaled in bearings 412 which are carried by standards 413. Each of the drums 361 may be connected to or disconnected from the shaft 407 to either cause or discontinue the operation of any one or all of the several shaping machines, by means of a clutch member 414 which is slidably keyed to the shaft 407 and which is provided with an arm 415 and an annular groove 416. The arm 415 is provided with a stud 417 for engagement with a recess 420 which is provided in one of the supporting disks 410 of the drum. The member 414 is slid axially on the shaft 407 in order to move the stud 417 into and out of operative engagement with the recess 420, by means of a yoke lever 421 which is pivotally mounted upon the frame structure of the machine for engagement with the groove 416 in the member 414. An inclined groove 422 is preferably provided in the face of the disk 410 adjacent to the recess 420 in order to facilitate the engagement of the stud 417 with the recess 420 (Fig. 33). It will be observed, in this connection, that this clutch mechanism is, in effect, of the one-tooth type, and can therefore only engage when the drum occupies a predetermined angular position with respect to the shaft 407. The operation of each of the shaping machines is, therefore, maintained properly timed with respect to the feeding device independently of the other machines. If the operation of any one of the shaping machines should for any reason be discontinued temporarily and its clutch member 414 subsequently actuated to continue the operation thereof, the shaping machine will not commence to function until its proper time arrives in the operating cycle of the machine as an entirety.

The several valve-actuating drums 361 are rotated in timed relation to the feeding device by means of an internal gear 423 which is fixed to the end of the shaft 407. This gear is driven, through the medium of an intermediate idler gear 426, by a pinion 424 which is fixed to the end of a shaft 425. The idler gear 426 is mounted on a bracket 427 which is secured to a worm gear 430. The gear 430 is mounted on the shaft 425 and may be adjusted angularly thereon by means of a worm 431. The shaft 425 is journaled in a bearing 432 carried by a standard 433 and is provided with a sprocket wheel 434 which is driven by the feeding device through the medium of a sprocket chain 435. By means of this construction the angular position of the shaft 407 and the drums 361 carried thereby may be adjusted with respect to the shaft 425 and and the feeding device by shifting the angular position of the idler gear 426 relatively to the gear 423 and pinion 424 through the medium of the worm 431 and gear 430. This phase adjustment, as it is termed, may be effected while the machine is in operation and accurately determines the operation of the several shaping machines with respect to that of the feeding device.

In the operation of the apparatus described above, mold charges of molten glass are delivered by the feeder through the funnel 181 and are received in succession by the movable trough sections 192 and delivered into the blank molds. Each section of the machine proceeds independently of the other sections to fabricate the mold charges which it receives, first applying settling suction in the blank mold; then counterblowing the parison in the blank mold; then opening the blank mold and receiving the parison in the blank mold; then swinging the blow mold to the upright finishing position; then reheating and finish-blowing the ware either with or without the application of preliminary puffs of air, and finally opening the blow mold and delivering the finished ware to the leer by means of its take-out mechanism.

As pointed out above, each of these operations may be made as long or as short as desired, provided that all of the successive steps are performed in time to enable the blank mold to receive its next charge of glass in its proper turn. The several operating steps are given an alloted portion of the cycle of operations by suitably changing the positions of the pins 376, 380, 402, and 404 upon the valve actuating drum 361.

The cycles of operation may be so arranged that the blow molds are active almost continuously. That is to say, the ware may be taken out of each blow mold immediately before a fresh parison is received in the blow mold, with only such interval of time between each take-out and the next succeeding transfer as is necessary for the blow mold to swing from the finish-blowing position to the transfer position. Such a method of operation makes for efficiency in temperature control, especially when relatively heavy molds are employed. Likewise, the parison mold may be kept in operation almost continuously, if desired, because as soon as a blank is transferred to the blow mold, the blank mold may be closed and is then in condition to immediately receive another mold charge for the fabrication of a parison for subsequent transfer to the blow mold during the time that the parison previously formed in the same blank mold is being blown to final form in the associated blow mold. When the parison is formed, that is to say, when all of the several shaping operations are concluded, the sections of the blank mold are opened leaving the bare parison supported by the neck ring and baffle plate, thereby permitting the internal heat therein to reheat the chilled skin. This reheating operation is thus performed in the blank mold cycle and during the latter stage of the finish blowing operation of the preceding parison, thus allowing ample time for both the reheating and finish blowing operations, as compared with prior methods in which the reheating operations occurred in the blow mold and which therefore unduly prolonged the duration of the blow mold cycle and the time that the blank mold was idle. This practically continuous operation of the blank and blow molds renders it possible to shape a parison in a blank mold during the time that a parison previously shaped in the same blank mold is being blown to final form in the associated blow mold.

One of the chief advantages of the "individual section" machine described herein is that the cycle of any section may be so adjusted as to give a much greater part of the cycle to the operations in the blank mold than is possible in any prior machine. In rotary machines the operations of settling and counterblowing in the blank mold are confined to narrow time-limits, whereas in the present machine it is possible not only to provide a long interval of time between the mold-charging and transferring operations, but also to distribute the settling and counterblowing intervals within limits which are much wider than the limits for these operations than are possible in prior machines, as illustrated in the diagram of Fig. 13a.

As pointed out above, the mounting of the molds on stationary supports makes it possible to make the molds much more massive than when the molds are mounted on moving tables. A massive mold containing a relatively large mass of metal may be maintained at the proper temperature for absorbing heat from the glass, without fluctuating below this temperature when the molds are opened, and above this temperature when the hot glass is first introduced into the mold.

Another advantage of the machine described herein is that the ware is delivered to the leer by the take-out mechanism in proper position to pass through the leer without additional stacking operations. This is shown on Fig. 3 of the drawings, where it will be observed that by arranging the take-out arms suitably with respect to their length and angular position, the ware may be placed upon the leer conveyor 270, which is much narrower than the lateral space occupied by the take-out mechanisms, in properly spaced relation for advancing through the leer.

The present invention is not restricted in its broad aspects to the specific method, herein disclosed, of transferring the blanks from the blank molds to the blow molds by inversion of the blow molds. This transfer may also be effected by swinging a neck ring between the blank mold and the blow mold, and the tangential relation described above between the lengthwise axis of the blank and its arc of swing may be produced by suitably arranging the neck ring with respect to the axis around which it swings.

The increased speed of production, made possible by correctly proportioning the cycles of operations with respect to the types of ware being made, enables a given quantity of ware to be produced with fewer molds than is possible on ordinary machines. Thus, for example, four sections constructed as described herein, are capable of performing the work for which six pairs of molds are required on ordinary machines. The savings in the cost of molds is, therefore, considerable.

From the foregoing it will be apparent that a relatively simple and efficient glass working apparatus is provided which embodies a plurality of independently operable glass shaping machines which may be employed for the simultaneous production of ware of different shapes and which is therefore particularly useful in the manufacture of limited quantities of such ware.

The particular embodiment of the invention illustrated and described has been selected by way of example only, and it is to be understood that various modifications, arrangements and combinations may be employed in fulfilling the spirit of the invention as defined in the claims.

I claim as my invention:

1. A glass shaping machine comprising a series of blank molds, each permanently disposed at a fixed blank forming station, a blow mold associated with each blank mold, means for automatically distributing mold charges from a single glass feeding device to said blank molds in a predetermined order, means associated with each blank mold for forming blanks therein, means for moving the blow mold of each pair of cooperating blank and blow molds to transfer blanks from the blank mold to a final blowing station, means located at each final blowing station for blowing the blanks to final form, and means for varying the duration of the blank forming, transferring and final blowing operations of each pair of associated blank and blow molds relative to each other and to the corresponding operations of the other pairs of associated molds.

2. A glass shaping machine comprising a series of blank molds, each permanently disposed at a fixed blank forming station, a blow mold associated with each blank mold, means for automatically distributing mold charges from a single glass feeding device to said blank molds in a predetermined order, means associated with each blank mold for forming blanks therein, means for moving the blow mold of each pair of cooperating blank and blow molds to transfer blanks from the blank mold to a final blowing station, means located at each final blowing station for blowing the blanks to final form, and means for varying both the time of occurrence and the duration of the blank forming, transferring and final blowing operations of each pair of associated blank and blow molds relative to each other and to the corresponding operations of the other pairs of associated molds.

3. A glass shaping machine comprising a series of blank molds each permanently disposed in a neck-down position at a fixed blank forming station, a blow mold associated with each blank mold, means for automatically distributing mold charges from a single glass feeding device to said blank molds in a predetermined order, means for forming blanks in said blank molds, means for independently oscillating each of said blow molds between a neck-down position at a blank forming station and a neck-up position at a finish blowing station to transfer blanks from the former to the latter, and means located at each final blowing station for blowing the blanks to final form.

4. A glass shaping machine comprising a series of blank molds, each permanently disposed in a neck-down position at a fixed blank forming station, a blow mold associated with each blank mold, trough mechanism for automatically distributing mold charges from a single glass feeding device to said blank molds in a predetermined order, means for forming blanks in said blank molds, means for independently oscillating each of said blow molds between a neck-down position at a blank forming station and a neck-up position at a finish blowing station, and means located at each finish blowing station for blowing the blanks to final form.

5. A glass shaping machine comprising a series of blank molds, each permanently disposed in a neck-down position at a fixed blank forming station, a blow mold associated with each blank mold, a trough associated with each blank mold, means for establishing communication between said troughs and a single glass feeding device in a predetermined order, means for forming blanks in said blank molds, means for independently oscillating each of said blow molds between a neck-down position at a blank forming station and a neck-up position at a finish blowing station to transfer blanks from the former to the latter, and means located at each of said finish blowing stations for blowing the blanks to final form.

6. A glass shaping machine comprising a series of blank molds, each permanently disposed in a neck-down position at a fixed blank forming station, a blow mold associated with each blank mold, a trough associated with each blank mold, means for selectively establishing communication between said troughs and a single glass feeding device in a predetermined order, means for forming blanks in said blank molds, means for independently oscillating each of said blow molds between a neck-down position at a blank forming station and a neck-up position at a finish blowing station to transfer blanks from the former to the latter, and means located at each of said finish blowing stations for blowing the blanks to final form.

7. A glass shaping machine comprising a series of blank molds, each permanently disposed in a neck-down position at a fixed blank forming station, a blow mold associated with each blank mold, a trough associated with each blank mold for directing mold charges thereto from a single glass feeding device, means for independently interrupting the delivering of glass to said troughs, means for forming blanks in said blank molds, means for independently oscillating each of said blow molds between a neck-down position at a blank forming station to a neck-up position at a finish blowing station to transfer blanks from the former to the latter, and means located at each of said finish blowing stations for blowing the blanks to final form.

8. A glass shaping machine comprising a series of blank molds, each permanently disposed in a neck-down position at a fixed blank forming station, a blow mold associated with each blank mold, means for automatically distributing mold charges from a single glass feeding device to said blank molds in a predetermined order, means associated with each blank mold for forming blanks therein, means for independently oscillating each of said blow molds between a neck-down position at a blank forming station to a neck-up position at a finish blowing station to transfer blanks from the former to the latter, means located at each of said finish blowing stations for blowing the blanks to final form, and means for varying the duration of the blank forming operations relative to each other.

9. A glass shaping machine comprising a series of blank molds, each permanently disposed in a neck-down position at a fixed blank forming station, a blow mold associated with each blank mold, means for automatically distributing mold charges from a single glass feeding device to said blank molds in a predetermined order, means for forming blanks in said blank molds, independent means for oscillating each of said blow molds between a neck-down position at a blank forming station and a neck-up position at a finish blowing station to transfer blanks from the former to the latter, means located at each of said finish blowing stations for blowing the blanks to final form, and means for varying the duration of the final blowing operations relative to each other.

10. A glass shaping machine comprising a series of blank molds, each permanently disposed at a fixed blank forming station, a blow mold associated with each blank mold, means for automatically distributing mold charges from a single glass feeding device to said blank molds in a predetermined order, means for forming blanks in said blank molds, means for independently oscillating the blow mold of each pair of associated blank and blow molds between a neck-down position at a blank forming station to a neck-up position at a finish blowing station to transfer blanks from the former to the latter, means located at each of said finish blowing stations for blowing the blanks to final form, and means for varying the duration of the blank transferring operations relative to each other.

11. A glass shaping machine comprising a series of blank molds, each permanently disposed in a neck-down position at a fixed blank forming station, a blow mold associated with each blank mold, means for automatically distributing mold charges from a single glass feeding device to said blank molds in a predetermined order, means associated with each blank mold for forming blanks therein, means for independently oscillating the blow mold of each pair of cooperating blank and blow molds between a neck-down position at a blank forming station and a neck-up position at a finish blowing station to transfer blanks from the former to the latter, means located at each of said finish blowing stations for blowing the blanks to final form, and means for varying the duration of the blank forming, transferring and final blowing operations of each pair of associated blank and blow molds relative to each other and to the corresponding operations of the other pairs of associated molds.

12. A glass shaping machine comprising a series of blank molds, each permanently disposed in a neck-down position at a fixed blank forming station, a blow mold associated with each blank mold, means for automatically distributing mold charges from a single glass feeding device to said blank molds in a predetermined order, means associated with each blank mold for forming blanks therein, means for independently oscillating the blow mold of each pair of associated blank and blow molds between a neck-down position at a blank forming station to a neck-up position at a finish blowing station to transfer blanks from the former to the latter, means located at each of said finish blowing stations for blowing the blanks to final form, and means for varying both the time of occurrence and the duration of the blank forming, transferring and final blowing operations of each pair of associated blank and blow molds relative to each other and to the corresponding operations of the other pairs of associated molds.

13. In the manufacture of glassware, the method of transferring a blank from a blank forming station to a finish blowing station, which consists in closing a blow mold about the blank and into supporting engagement therewith at the blank forming station and swinging said mold about a horizontal axis to the finish blowing station, the impelling force being applied without the arc described by the center of gravity of the blank.

14. In the manufacture of glassware, the method of transferring a blank from a blank forming station to a finish blowing station, which consists in closing a blow mold about the blank and into supporting engagement therewith at the blank forming station and swinging said mold about a horizontal axis to the finish blowing station, the center of the area of thrust applied to the blank being disposed without the arc described by the center of gravity of the blank.

15. In the manufacture of glassware, the method of transferring a blank from a blank forming station to a finish blowing station, which consists in closing a blow mold about the blank and into engagement therewith while it is supported out of contact with the blank mold at the blank forming station, and swinging said mold about a horizontal axis to the finish blowing station, the impelling force being applied in a direction at an acute angle with the longitudinal axis of the blank and 16. In the manufacture of glassware, the method of transferring a blank from a blank forming station to a finish blowing station, which consists in closing a blow mold about the blank and into engagement therewith while it is supported out of contact with the blank mold at the blank forming station and swinging the said mold about a horizontal axis to the finish blowing station, the length of the radius of swing drawn to the center of gravity of the blank being of less length than the radius drawn to the center of application of the impelling force.

17. In the manufacture of glassware, the method of transferring a blank from a blank forming station to a finish blowing station, which consists in closing a blow mold about the blank and into engagement therewith while it is supported out of contact with the blank mold at the blank forming station and swinging said mold about a horizontal axis to the finish blowing station, the distance from the axis of swing to the center of application of the impelling force being greater than the distance from said axis to the center of gravity of said blank.

18. In the manufacture of glassware, the method of transferring a blank from a blank forming station to a finish blowing station, which consists in closing a blow mold about the blank and into engagement therewith while it is supported out of contact with the blank mold at the blank forming station and swinging said mold about a horizontal axis to the finish blowing station with the longitudinal axis of the blank disposed substantially tangentially to the arc described by the center of gravity of the blank.

19. In the manufacture of glassware, the method of transferring a blank from a blank forming station to a finish blowing station, which consists in closing a blow mold about the blank and into engagement therewith while it is supported out of contact with the blank mold at the blank forming station and swinging said mold about a horizontal axis to the finish blowing station with the longitudinal axis of the blank disposed substantially tangentially to the arc described by the center of symmetry of the blank.

20. In the manufacture of glassware, the method of transferring a blank from a blank forming station to a finish blowing station, which consists in closing a blow mold about the blank and into engagement with the neck thereof at the blank forming station, and swinging the said mold about a horizontal axis to the finish blowing station with the longitudinal axis of the blank disposed substantially tangentially to the arc described by the center of gravity of the blank.

21. In the manufacture of glassware, the method of transferring a blank from a blank forming station to a finish blowing station, which consists in closing a blow mold about the blank and into engagement therewith while it is supported out of contact with the blank mold at the blank forming station, and swinging the said mold about a horizontal axis to the finish blowing station with the longitudinal axis of the blank disposed substantially tangentially to the arc described by the center of gravity of the blank.

22. In the manufacture of glassware, the method of transferring a blank from a blank forming station to a finish blowing station, which consists in closing a blow mold into supporting engagement with a blank supported in a neck-down position and out of contact with the blank mold at a blank forming station and swinging said mold and blank about a horizontal axis to a neck-up position at the finish blowing station with the longitudinal axis of the blank disposed substantially tangentially to the arc described by the center of gravity of the blank.

23. In the manufacture of glassware, the method of transferring a blank from a blank forming station to a finish blowing station, which consists in closing a blow mold into engagement with the neck of a blank supported in a neck-down position and out of contact with the blank mold at a blank forming station, and swinging the mold and blank about a horizontal axis to a neck-up position at the finish blowing station with the longitudinal axis of the blank disposed substantially tangentially to the arc described by the center of gravity of the blank.

24. In the manufacture of glassware, the method of transferring a blank from a blank forming station to a finish blowing station, which consists in closing a blow mold into supporting engagement with the neck of a blank supported in a neck-down position and out of contact with the blank mold at a blank forming station, and swinging the mold and blank about a horizontal axis to a neck-up position at the finish blowing station, the zone of contact between the mold and the blank being offset relative to the radius of swing passing substantially through the point of tangency of the longitudinal axis of the blank with the arc described by the center of gravity of the blank.

25. In the manufacture of glassware, the method of transferring a blank from a blank forming station to a finish blowing station, which consists in closing a blow mold into engagement with the neck of a blank supported in a neck-down position and out of contact with the blank mold at a blank forming station, and swinging the blank and mold about a horizontal axis to a neck-up position at the finish blowing station, the radius of swing passing through the center of the plane of critical bending of the blank being angularly displaced from the radius of swing passing through the point of tangency of the longitudinal axis of the blank with the arc described by the center of gravity of the blank.

26. In the manufacture of glassware, the method of transferring a blank from a blank forming station to a finish blowing station, which consists in closing a blow mold into engagement with the neck of a blank supported in a neck-down position and out of contact with the blank mold at a blank forming station, and swinging the mold and blank about a fixed axis to the finish blowing station with the longitudinal axis of the blank disposed substantially tangentially to the arc described by the center of gravity of the blank.

27. In the manufacture of glassware, the method of transferring a blank from a blank forming station to a finish blowing station, which consists in closing a blow mold into engagement with the neck of the blank while it is supported out of contact with the blank mold at the blank forming station and swinging the mold and blank about a fixed horizontal axis to a finish blowing station located on substantially the same working level, the zone of support of the blank being vertically offset relative to the horizontal plane of the axis of swing.

28. The combination with a glass working apparatus embodying a blank forming station and a finish blowing station, of a blow mold mounted for oscillation about a horizontal axis between said stations, means for closing said mold into supporting engagement with a blank at said blank forming station, means for swinging said mold and blank from the first mentioned station to the last mentioned station, said mold being adapted to apply an impelling force to the blank without the arc described by the center of gravity thereof during the transferring operation.

29. The combination with a glass working apparatus, embodying a blank forming station and a finish blowing station, of a blow mold mounted for oscillation about a horizontal axis between said stations, means for closing said mold into supporting engagement with said blank at said blank forming station, means for swinging said mold and blank from the first mentioned station to the last mentioned station, said mold being adapted to apply an impelling thrust to the blank, the zone of application of which is disposed without the arc described by the center of gravity of the blank.

30. The combination with a glass working apparatus, embodying a blank forming station and a finish blowing station, of a blow mold mounted for oscillation about a horizontal axis between said stations, means for closing said mold into supporting engagement with a blank at said blank forming station, means for swinging said mold and blank from the first mentioned station to the last mentioned station, the length of the radius of swing of said mold drawn to the center of gravity of the blank being less than that drawn to the center of the zone of application of the impelling force applied to the blank by said mold.

31. The combination with a glass working apparatus embodying a blank forming station and a finish blowing station, of a blow mold mounted for oscillation about a horizontal axis between said stations, means for closing said mold into supporting engagement with a blank at said blank forming station, means for swinging said mold and blank from the first mentioned station to the last mentioned station, the distance from the axis of swing of said mold to the center of the zone of application of the impelling force applied to the blank thereby being greater than the distance from said axis to the center of gravity of the blank.

32. A glass working apparatus embodying a permanently inverted blank mold, an invertible finish blow mold associated therewith, means for opening said blank mold, means for closing said blow mold into engagement with the blank while it is supported out of contact with the blank mold, means for moving said blow mold to transfer the blank from a neck-down position in said blank mold to a neck-up position at a finish blowing station, and means independent of the blank forming means and located at the finish blowing station for blowing said blank to final form at said finish blowing station.

33. A glass working apparatus embodying a mold, means for moving said mold between a plurality of glass forming stations, a device movable with said mold for opening and closing the same, and means mounted in the path of movement of said device and adapted to engage one side of said device to open said mold at one of said stations and to engage the other side thereof to close said mold at another of said stations.

34. A glass working apparatus embodying a mold, means for moving said mold between a plurality of glass forming stations, a device mounted adjacent to and movable with said mold for opening and closing the same, and single means mounted in the path of movement of said device and adapted to engage one side of said device to open said mold at one of said stations and to engage the other end thereof to close said mold at another of said stations.

35. A glass working apparatus embodying a mold element, means for moving said mold between a plurality of glass forming stations, a device mounted adjacent to and movable with said mold for opening and closing the same, and fluid pressure means mounted in the path of movement of said device and adapted to engage one side of said device to open said mold at one of said stations and to engage the other side thereof to close said mold at another of said stations.

36. A glass working apparatus embodying a mold element, means for moving said mold between a plurality of glass forming stations, a member movable with said mold for opening and closing the same, a fluid pressure cylinder having a piston disposed in the path of movement of said member and adapted to engage one end of said member to open said mold at one of said stations and to engage the other end thereof to close said mold at another of said stations.

37. A glass working apparatus embodying a finishing mold, means for moving said mold between a neck-down position at a blank forming station and a neck-up position at a finish blowing station to transfer a blank therebetween, means movable with said mold for opening and closing the same, and single means mounted in the path of movement of said mold opening and closing means for actuating the same to close the mold at said blank forming station and opening the same at said finish blowing station.

38. A glass working apparatus embodying a finishing mold, means for moving said mold between a neck-down position at a blank forming station and a neck-up position at a finish blowing station to transfer a blank therebetween, means movable with said mold for opening and closing the same, and single means mounted in the path of movement of said mold opening and closing means for actuating the same to close the mold at said blank forming station and opening the same at the finish blowing station.

39. A glass working apparatus embodying a finishing mold, means for moving said mold between a neck-down position at a blank forming station and a neck-up position at a finish blowing station to transfer a blank therebetween, mechanism movable with said mold for opening and closing the same, and single means mounted in the path of movement of said mold opening and closing mechanism and adapted to actuate the same from one side thereof to close the mold at said blank forming station and from another side of said mechanism to open said mold at said finish blowing station.

40. A glass working apparatus embodying a finishing mold, means for moving said mold between a neck-down position at a blank forming station and a neck-up position at a finish blowing station to transfer a blank therebetween, mechanism including a rack bar movable with said mold for opening and closing the same, and single means mounted adjacent to said mold and operable in one direction to engage one end of said rack bar to close the mold at said blank forming station and the other end of said rack bar to open said mold at said finish blowing station.

41. A glass working apparatus, comprising a blank mold permanently disposed in neck-down position, an invertible finish blow mold associated with said blank mold, independent means for opening and closing each of said molds, means for moving said blow mold back and forth between a neck-down position at the blank forming station at which station the blow mold is positioned to surround a blank formed in said blank mold and a neck-up position at a finish blowing station, means independent of said finish blow mold and the finish blowing means hereinafter recited for forming a blank in said blank mold at the blank forming station, means to cause the blow mold to close about the formed blank at the blank forming station after it has been exposed by the opening of said blank mold, means to cause the movement of said blow mold carrying the formed blank therein from a neck-down position at the blank forming station to a neck-up position at the finish blowing station, and means independent of said blank forming means for blowing the blank to final form in said finish blow mold at the finish blowing station, whereby blowing pressure may be applied to the interior of an article in said blow mold at the finish blowing station concomitantly with at least a part of the forming operations being carried on on the next succeeding blank at the blank forming station by said blank forming means acting in cooperation with said blank mold.

42. A glass forming machine, comprising a support, a parison mold mounted thereon and adapted to receive a supply of glass, means cooperating with the parison mold to form a parison therein, a blow mold adapted to cooperate with said parison mold to receive the parisons therefrom and form them into finished articles of glassware, means for mounting said blow mold for oscillation toward and from the axis of the parison mold to receive the parison in the blow mold and to thereafter remove it to a final blowing position, said mounting including a pivot spaced from the axis of the blow mold and fixed on said support, means for oscillating the blow mold about the pivot, a blow head adapted to cooperate with the blow mold to blow the parisons to final form at the final blowing position, and means for timing the operations of said molds and associated instrumentalities to cause the blow head to be positioned in cooperation with the blow mold and to supply fluid pressure to the interior of the glass article therein while glass is being introduced into the parison mold for the formation of the succeeding parison therein.

43. A glass forming machine, comprising a support, a parison mold mounted thereon and adapted to receive a supply of glass, means cooperating with the parison mold to form a parison therein, a blow mold adapted to cooperate with said parison mold to receive the parisons therefrom and form them into the finished articles of glassware, means for mounting said blow mold for oscillation toward and from the axis of the parison mold to receive the parison in the blow mold and to thereafter remove it to a final blowing position, said mounting including a pivot spaced from the axis of the blow mold and fixed on said support, means for oscillating the blow mold about said pivot, and a blow head independent of the parison forming means and cooperable with the blow mold to blow parisons to final form therein while the blow mold is at the final blowing position, whereby blowing pressure may be admitted to the interior of an article within the blow mold while a succeeding parison is being formed within said parison mold.

Signed at Hartford, Conn., this 28th day of August, 1924.

HENRY W. INGLE.